US008334889B2

(12) United States Patent
Blanche et al.

(10) Patent No.: US 8,334,889 B2
(45) Date of Patent: Dec. 18, 2012

(54) AUTO STEREOSCOPIC 3D TELEPRESENCE USING INTEGRAL HOLOGRAPHY

(75) Inventors: Pierre-Alexandre Jean Blanche, Tucson, AZ (US); Arkady Bablumyan, San Diego, CA (US); Nasser N. Peyghambarian, Tucson, AZ (US)

(73) Assignees: TIPD, LLC, Tucson, AZ (US); The Arizona Board of Regents on Behalf of the University of Arizona, Tucson, AZ (US)

( * ) Notice: Subject to any disclaimer, the term of this patent is extended or adjusted under 35 U.S.C. 154(b) by 271 days.

(21) Appl. No.: 12/954,758

(22) Filed: Nov. 26, 2010

(65) Prior Publication Data

US 2011/0228040 A1    Sep. 22, 2011

Related U.S. Application Data

(60) Provisional application No. 61/315,321, filed on Mar. 18, 2010.

(51) Int. Cl.
*H04N 7/14* (2006.01)
(52) U.S. Cl. ............... 348/14.07; 348/14.08; 348/14.12; 359/11; 359/32
(58) Field of Classification Search .... 348/14.01–14.16, 348/40; 345/419, 205; 359/11, 32, 9, 35, 359/242, 244
See application file for complete search history.

(56) References Cited

U.S. PATENT DOCUMENTS 5,064,264 A   11/1991 Ducharme et al.
5,569,565 A   10/1996 Kawakami et al.
5,796,498 A   8/1998 French
(Continued)

FOREIGN PATENT DOCUMENTS

WO          01/45943 A2    6/2001

OTHER PUBLICATIONS

Eralp et al. "Variation of Bragg condition in low-glasstransition photorefractive polymers when recorded in reflection geometry," 2007 Optical Society of America, Sep. 3, 2007 / vol. 15, No. 18 / Optics Express, pp. 11622-11628.

(Continued)

*Primary Examiner* — Melur Ramakrishnaiah
(74) *Attorney, Agent, or Firm* — Eric A. Gifford

(57) ABSTRACT

A holographic direct-view display system uses holographic integral imaging techniques that is an auto stereoscopic way to reproduce parallax and occlusion. The display is not resolution limited and is scalable to display life size images if desired. The system can be used to transmit 3D depictions of a scene at video and sub-video rates as well as other information, such as images of documents or computer generated images. The images may be captured, transmitted and displayed in real-time (or near real-time) for telepresence or stored for time-shifted display. The system combines integral holography, a pulsed laser to record the hologram at high speed and a dynamic refreshable holographic material such as a photorefractive polymer as a recording media. The system uses techniques to write, read and erase the updateable hologram that allow the holographic material, hence direct-view display to remain stationary throughout each of the processes for continuous presentation of the hologram to the audience. The system may write, read and erase at the same time and continuously to increase throughput. This system may also use additional novel techniques to improve brightness, efficiently implement a full-parallax display and to implement a full-color display in a transmission geometry.

34 Claims, 16 Drawing Sheets

U.S. PATENT DOCUMENTS

| | | |
|---|---|---|
| 6,281,994 B1 | 8/2001 | Horikoshi et al. |
| 6,859,293 B2 | 2/2005 | Klug et al. |
| 7,227,674 B2 | 6/2007 | Klug et al. |
| 2010/0149311 A1* | 6/2010 | Kroll et al. ............... 348/40 |
| 2010/0149610 A1* | 6/2010 | Schwerdtner et al. ........ 359/32 |
| 2012/0058418 A1* | 3/2012 | Wang et al. ............... 430/2 |

OTHER PUBLICATIONS

Tay et al., "An updatable holographic three-dimensional display," 2008 Nature Publishing Group, vol. 451, Feb. 7, 2008, pp. 694-698.

Peyghambarian et al., "Rewritable Holographic 3D Displays," OPN Jul./Aug. 2008, pp. 23-27.

Blanche et al., "An Updatable Holographic Display for 3D Visualization," Journal of Display Technology, vol. 4, No. 4, Dec. 2008, pp. 424-430.

"Cisco TelePresence On-Stage Holographic Video Conferencing Experience—Musion Systems," http://www.eyeliner3d.com/cisco_telepresence_holographic_video_conferencing.html, pp. 1-2.

"Holographic Technology—Musion Eyeliner Technical," http://www.eyeliner3d.com/musion_eyeliner_mechanics.html, pp. 1-2.

"Musion On-Stage Holographic TelePresence—Life-Size Video Conferencing," http://www.musion.co.uk/musion_telepresence.html, p. 1.

Volodin et al., "Highly efficient photorefractive polymers for dynamic holography," Optical Engineering, Aug. 1995, vol. 24, No. 8, pp. 2213-2223.

* cited by examiner

AUTO STEREOSCOPIC 3D TELEPRESENCE USING INTEGRAL HOLOGRAPHY

CROSS-REFERENCE TO RELATED APPLICATIONS

This application claims benefit of priority under 35 U.S.C. 119(e) to U.S. Provisional Application No. 61/315,321 entitled "Auto Stereoscopic 3D Telepresence Using Integral Holography" and filed on Mar. 18, 2010, the entire contents of which are incorporated by reference.

GOVERNMENT LICENSE RIGHTS

This invention was made with Government support under FA9550-07-1-0071 awarded by the Air Force Office of Scientific Research, under W31P4Q-07-0267 awarded by the US Army Aviation & Missile Command, and under FA9550-09-C-0015 awarded by the Air Force Office of Scientific Research. The Government has certain rights in this invention.

BACKGROUND OF THE INVENTION

1. Field of the Invention

This invention relates to systems and methods for 3D telepresence and other 3D display applications for moving images and more particularly to systems and methods for presenting auto stereoscopic integral holograms on a stationary direct-view display at video or sub-video rates.

2. Description of the Related Art

Video Conferencing

Video conferencing is a set of interactive telecommunication technologies that allow two or more locations to interact via two-way video and audio transmissions simultaneously. Standard video conferencing does not try to produce the illusion that connected locations are merged together for better interaction.

Telepresence

"Telepresence" refers to a set of technologies that allow a person to feel as if they were present, to give the appearance that they were present, or to have an effect, at a location other than their true location. Several techniques are used and emphasis is placed on image quality.

Telepresence may or may not include natural size imaging of the people, three dimensional reproduction of the scene, mutual interaction of the remote location or full video rate reproduction. Telepresence is a qualitative improvement over the standard video conferencing system. Telepresence systems include the elements presented in the block diagram of FIG. 1. For simplicity only a one-way channel is described. Telepresence system may have two-way channels of the same or different technologies (example: telepresence in one way and standard video conferencing the other way).

Telepresence systems include the following elements for each of the channels. An image capture system 1 takes pictures of a dynamic scene at the remote location at a refresh rate equal or superior to the image display system refreshing rate (full video or sub-video rates). An image processing unit 2 processes and transfers the captured images over a network link 3 to another location. An image data receiver unit 4 receives data sent by the image processing unit over the network link. The receiver unit can also be used for some or all the data processing. An image display unit 5 displays the images taken at the remote location to the audience at the video or sub-video rates. Full video rates of 30 Hz (30 Images per second) are desired. However, many applications may benefit from sub-video rates several Hz or even update rates of a couple seconds per hologram.

Telepresence has many applications like videoconferencing, connecting communities, hazardous environments, remote surgery and telemedicine, education, telepresence art and museum. Telepresence is of great benefit to reduce displacement cost of staff and employee, and is ecological by cutting the carbon emission and the fossil fuel consumption that would have been consumed by traveling to and from the remote location.

2D Telepresence

Musion Systems Ltd touts its Musion Eyeliner® system as "On-Stage Holographic TelePresence" that provides 3D holography. But holography is defined as the recording of a light interference pattern and the further diffraction of the light by the recorded structure. There are two aspects in holography: the recording and the replay. Neither is used by the Musion system. In fact the technology behind this system is called "paper ghost effect" and refers to the projection of the 2D image to a semitransparent screen. The image appears to the viewer as floating in thin air because the screen is not perceptible. As shown in FIG. 2, the Musion "On-Stage Holographic TelePresence" system is using a projector 10 that displays an image onto a semitransparent screen 20 so the audience 30 can see both the projected image and the background 40, giving the illusion that the image is floating in thin air.

Holography is known as the ultimate technique to represent an object or a scene in three dimensions. Holography reproduces perspective, parallax and occlusion. Actually, holography is able to reproduce the exact same light pattern as the one scattered by the real object. In the case of the Musion Eyeliner® system, the image is not three-dimensional, it is two-dimensional only. The Musion Eyeliner® system cannot reproduce perspective or parallax which are part of the realism for a telepresence display. Nevertheless, Musion telepresence system is using all the blocks presented in FIG. 1. The image capture system is a single camera, the image is processed to accommodate the orientation of the screen, the image is sent through a network link to a projector that illuminates the semitransparent screen altogether forming the image display system.

3D Telepresence

There exist telepresence systems that can reproduce the third dimension. They can be classified in two ways: stereoscopic systems and integral imaging systems.

Stereoscopic Systems

Stereoscopic systems only display two images to reproduce relief. One is intended to be seen by the left eye of the viewer and the other by the right eye. This reproduces parallax but not different perspectives; when the viewer moves the image remains static. The viewer cannot explore different perspectives of the scene, which accounts for some lack of realism in the image.

Moreover, to ensure the intended image reaches the intended eye, the audience has to wear glasses. There exist different systems where the images are coded into different colors and the glasses are filters (anaglyph), where the images are orthogonally polarized and the glasses are polarizers or where the image are temporally multiplexed and the glasses are synchronized shutters.

Integral Imaging

Integral imaging is an auto stereoscopic 3D display technique, meaning that it displays a 3D image without the use of special glasses on the part of the viewer. Integral imaging reproduces a light field that creates stereo images exhibiting parallax, occlusion and more than two perspectives when the viewer moves. There exist different techniques to produce integral images, one involves placing an array of microlenses in front of the camera and having the same kind of microlenses in front of the display. It is also possible to compute the integral image out of several images of the same scene taken at different positions or angles then replaying it with the adequate system. As shown in FIG. 3, integral imaging uses a lens array 100 in front of a display 110. Each lens 120 of the lens array covers a finite surface 130 of the display that contains pixels 140.

The limitation of the integral imaging technique for telepresence is the degradation of the resolution of the display. Indeed, each microlens in front of the display has a spatial extension that defines the horizontal and vertical resolution of the reproduced image. The resolution of the third dimension is defined by the number of pixels that are covered by the lens. If the microlens size increases, covering more pixels, the third dimension has a better resolution but the horizontal and vertical resolution are degraded (and conversely). To obtain an acceptable resolution in the three dimensions the microlenses should be extra small (equal or lower than eye resolution) but should also cover a large amount of pixels, altogether, this means those pixels should be extremely small and numerous which is not technically possible.

Integral Holography

Holography is the recording of a light interference pattern AND the diffraction of light by the recorded pattern. Holography is a technique that allows the light scattered from an object to be recorded and later reconstructed so that it appears as if the object is in the same position relative to the recording medium as it was when recorded. Alternately, holograms can be computer generated by calculating the modulation pattern that would have been formed if two beams with certain characteristics (wave front, intensity) would have crossed each other. The calculated pattern is next transferred to a medium to make the actual hologram. The image changes as the position and orientation of the viewing system change in exactly the same way is if the object were still present, thus making the recorded image (hologram) appear three dimensional. The technique of holography can also be used to optically store, retrieve, and process information.

In the optical recording setup, one beam is called the reference beam and does not carry any information and the other beam is called the object beam and is modulated in intensity and/or phase from the scene (either directly or by computer generation). The holographic recording material should be sensitive to the intensity modulation generated by the interference and have sufficient resolution to resolve the spatial frequencies of the scene. A hologram is read by sending a reading beam to the hologram and by looking at the diffracted beam. The reading geometry and the reading source characteristics are determined by the type of hologram. Generally speaking, there exist two holographic recording geometries, transmission and reflection. Transmission is so called because the reading beam passes through the material to be diffracted. Reflection is so called because the diffracted beam is diffracted back to the same side of the media as the incident reading beam.

As shown in FIG. 4, holography involves writing and reading an interference pattern 210 into a holographic recording media 200. There basically exist two holographic geometries: reflection and transmission characterized by the orientation of the reference beam 220 and the object beam 230 compared to the media 200. From the recording geometry depends the reading geometry where a reading beam 240 is used to display the information as a diffracted beam 250. There could be some part of the reading beam that is not diffracted by the hologram 260. In the transmission geometry, the reading beam 240 goes through the holographic recording media 200 and the diffracted beam 250 emerges on the other side of the media. In the reflection geometry, the reading beam 240 is diffracted back by the interference pattern 210 so the diffracted beam 250 is in the same side of the media 200 than the reading beam 240.

Integral holography is a technique that combines holography and integral imaging. The writing and reading of the 3D image is performed using the diffraction of light principle, but the image is encoded using the integral imaging principle. The full hologram is recorded hogel by hogel. In this case we are using the term "hogel" as a contraction of holographic pixel. Each hogel is recorded by the interference between a reference beam and an object beam. The object beam is modulated by the hogel data calculated according to the image of the scene taken from different position or different angle.

A holographic (diffractive) auto (no glasses) stereoscopic (3D) system using a grey-scale (single-color) transmission geometry as shown in FIG. 5, a laser 300 emits a coherent beam 310 that is split into a reference beam 320 and an object beam 330 by a beam splitter 340. The object beam is expanded by means of a telescope 350 and the beam's amplitude is structured by a device 360 that can be a transparent image, a mask, a spatial light modulator etc. The object beam is then resized by a telescope 370, directed by one or several mirrors 380, and focused by a lens 390 to the holographic recording material 400. That lens 390 is spherical in the case of full parallax and cylindrical in the case of horizontal parallax only. The reference beam 320 is shaped by optics 410 to match the shape of the object beam at the holographic material location, and directed by a mirror 420 to the holographic recording material. After one hogel has been recorded, the material is moved to the next hogel location by a translation stage 430. Controlling electronics 500 ensures the synchronization between the laser 300, the translation stage 430 and the device 360 that structures the object beam. In the case the device 360 that structures the object beam 330 is electronic; a memory 510 could be used to store the hogel data. During recording, the material is positioned or otherwise shielded so that the powerful write beam is not incident on a viewer's eyes for safety.

When all the hogels have been recorded, the material is processed to develop the hologram (if needed) and moved to the reading position 440, where a reading source 450 emits a light beam 460 that is expanded by a telescope 470 and diffracted by the hologram 440 in a diffracted beam 480 toward the viewer's eyes.

In the case of a refreshable holographic recording material, when the hologram needs to be erased, the holographic recording device 400 is moved to the erasing location, where the erasing process occurs. In the case of erasure by light, like with photorefractive materials, an erasing light source 600 emits a beam 610 that is expanded with a telescope 620 and illuminates the whole hologram area. Some materials need a heating process for the hologram to be erased. Some materials like photo thermo plastic, need electrical charging and heating the material to erase the hologram. Once erased, the recording material is moved back to the recording position.

SUMMARY OF THE INVENTION

The following is a summary of the invention in order to provide a basic understanding of some aspects of the invention. This summary is not intended to identify key or critical elements of the invention or to delineate the scope of the invention. Its sole purpose is to present some concepts of the invention in a simplified form as a prelude to the more detailed description and the defining claims that are presented later.

The present invention provides a system and method for continuous presentation of auto stereoscopic integral holograms at video or sub-video refresh rates. The holographic direct-view display system uses a holographic integral imaging technique that is an auto stereoscopic way to reproduce parallax and occlusion. The display is not resolution limited and may be scalable to display life size images if desired. The system can be used to transmit 3D depictions of a scene at video and sub-video rates as well as other information, such as images of documents or computer generated images. The images may be captured, transmitted and displayed in real-time (or near real-time) for a telepresence application or stored for time-shifted display for other applications (e.g. movie theaters). The system combines integral holography, a pulsed laser to record the hologram at high speed and a dynamic refreshable holographic material such as a photorefractive polymer as a recording media. The system uses techniques to write, read and erase the updateable hologram that allow the holographic material, hence direct-view display to remain stationary throughout each of the processes for continuous presentation of the sequence of holograms to the audience at video or sub-video rates. The system may write, read and erase at the same time and continuously to increase throughput. This system may also use additional novel techniques to improve brightness, efficiently implement a full-parallax display and to implement a full-color display in a transmission geometry.

In an embodiment a holographic direct-view display system comprises a memory for receiving and storing computer-generated images (hogel data) encoded using the principle of integral imaging. These images may be derived from multiple images captured of a scene at video or sub-video rates. The original image capture may be performed in approximately real-time or time-shifted. A pulse laser emits a pulse that is split into object and reference beams. The object beam is modulated with the hogel data (one hogel at a time) and interfered with the reference beam at a dynamic refreshable holographic material such as a photorefractive polymer. The beams are steered from one position to the next (line or line segment) to record the next hogel of the current hologram. A reading beam is diffracted off of the entire holographic material. The audience views the diffractive beam off of the holographic material (i.e. a direct-view display) to view the entire hologram. A beam erases the hologram and the process repeats to present the hologram at video or sub-video rates. The holographic material remains stationary throughout to present the hologram to the audience at the video or sub-video rates.

In an embodiment, the stationary holographic material is illuminated with the reading beam to continuously present the hologram to the audience. The write beam is steered from one position to the next to record the next hogel. When the last hogel of the current hologram has been recorded the write beam is encoded and steered to write the first hogel of the next hologram. The write beam may also function to simultaneously erase the previous hologram while it records the new hologram. Alternately, every other pulse of the write beam could be used to erase the hogel. Each hogel position would first be addressed with an erase pulse and then with the pulse encoded with the hogel data. Alternately, a separate focused erase beam may either lead the write beam or may be pulsed and interlaced in time with the pulsed write beam to erase the next hogel just prior to writing. Accordingly, the holographic material does not have to move from position to position to write each hogel, to move to a different location to read the hologram and yet another location to erase the hologram. Furthermore, this approach provides for the writing and reading of the hologram and writing and erasing of the hologram to be performed at the same time that improves throughput.

In an embodiment in which the system is configured for a transmission recording geometry, the entire hologram may be read while individual hogels are being recorded by placing a mask/mirror between the writing source and the holographic material and positioning the reading source on the other side of the holographic material (viewer side). The mask/mirror is formed with aperture (entire line for HPO or single line segment for full-parallax). The mask/mirror moves with the steered write beams so that the object and reference beams pass through the slit and interfere at the specified position to write the encoded hogel. The mask prevents any of the write beam from illuminating neighboring hogels. The mask/mirror is formed with a reflective surface facing the holographic material and reading source so that the reading beam is reflected and transmitted through the holographic material. A filter may be positioned between the holographic material and the audience to remove any of the write beam that is not absorbed by the holographic material.

In an embodiment, a holographic optical element (HOE) is placed between the holographic material and the write beam. The HOE is designed so that the object beam passes through the element unaffected but the reference beam is diffracted at an acute angle. This has the effect of increasing the diffraction efficiency of the holographic material, which in turn increases the brightness of the hologram.

The hologram may be written line-by-line (HPO) or line segment-by-line segment (full-parallax). The write function may be multiplexed to increase the throughput for full-parallax recording. A lens array focuses the object beam at the holographic material at multiple positions. The object beam is structured so that each position corresponds to the correct hogel information. A diffractive element splits the reference beam into a like number of reference beams that interfere with respective object beams to write multiple hogels at once.

Full color holograms can be generated by recording three holograms; one for each fundamental color (red, green and blue). In transmission geometry, angular multiplexing can be used in which the three object beams (derived from a single pulsed laser source) are incident at different angles to the holographic material. To avoid cross talk between those holograms, two of the object beams have orthogonal polarizations and the third object beam is positioned so that vector is orthogonal to the external electric field at which the diffraction efficiency of the hologram is zero.

The scale of the displayed hologram may be smaller than, equal to or larger than the natural size of the depicted scene. Because the system is a direct-view display, the holographic material must be as big as the displayed scene. Conventional photorefractive holographic materials such as crystals and semiconductors have a limited form factor, no greater than 2 inches by 2 inches. PR polymers may be reliably produced with a form factor of at least 12 inches by 12 inches. It therefore becomes possible to make useful displays using a single PR polymer and to make life size displays by tiling multiple PR polymers. The tiled PR polymers may be addressed by a single write/read/erase system or by respective addressing systems.

These and other features and advantages of the invention will be apparent to those skilled in the art from the following detailed description of preferred embodiments, taken together with the accompanying drawings, in which:

DETAILED DESCRIPTION OF THE INVENTION

The present invention describes a holographic direct-view display system using a holographic integral imaging technique that is an auto stereoscopic way to reproduce parallax and occlusion. The display is not resolution limited and is scalable to display life size images if desired. The system can be used to transmit 3D depictions of a scene at video and sub-video rates as well as other information, such as images of documents or computer generated images. The images may be captured, transmitted and displayed in real-time (or near real-time) for telepresence or stored for time-shifted display. The system combines integral holography, a pulsed laser to record the hologram at high speed and a dynamic refreshable holographic material such as a photorefractive polymer as a recording media. The system uses techniques to write, read and erase the updateable hologram that allow the holographic material, hence direct-view display to remain stationary throughout each of the processes for continuous presentation of the hologram to the audience. The system may write, read and erase at the same time and continuously to increase throughput. This system may also use additional novel techniques to improve brightness, efficiently implement a full-parallax display and to implement a full-color display in a transmission geometry.

Figure 6:
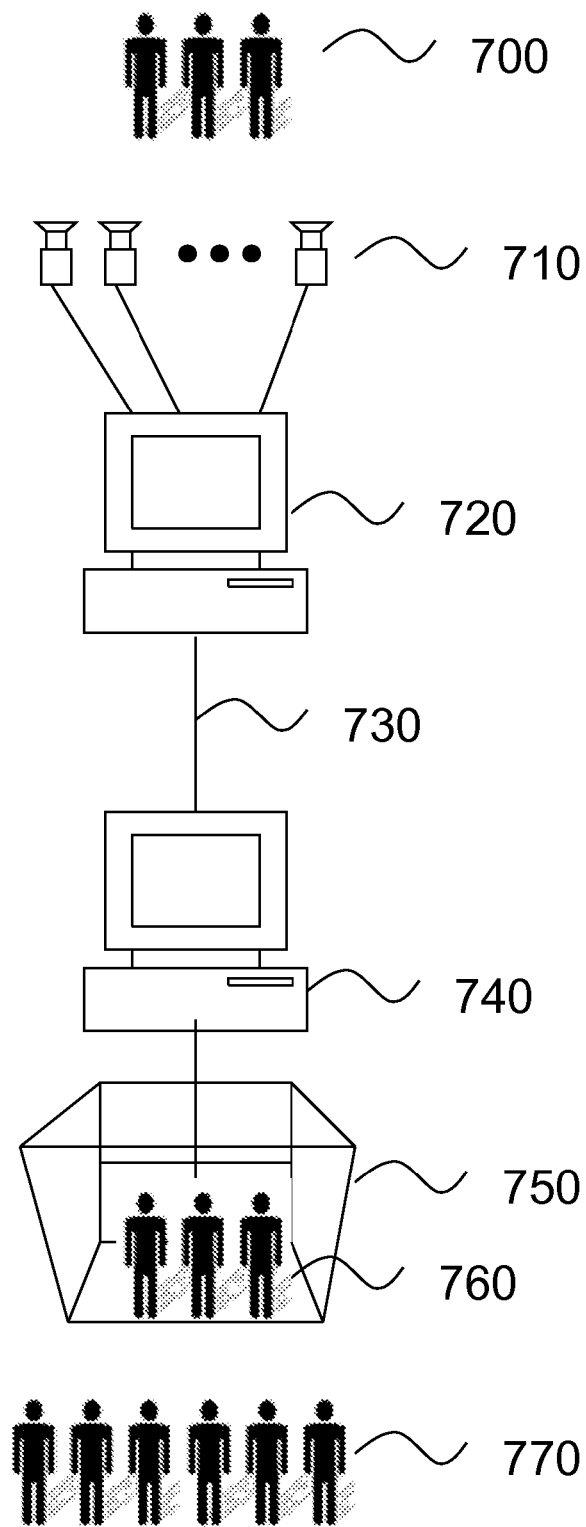
FIG. 6 is a flow diagram of an auto stereoscopic 3D telepresence system in accordance with the present invention.

The overall telepresence system is depicted in FIG. 6. Several cameras looking at the scene from different positions (different geometries possible) gather information. The scene is "dynamic" in the sense that it is changing over time. A computer processes the information according to the principles of integral holography. The processed information is transmitted to another location via a communication network. Alternatively, the images can be transmitted and processed at the holographic recording setup location. A computer receives the information at the remote location and drives a refreshable integral holographic display to display the auto stereoscopic image to the audience. The display may display holograms at video or sub-video rates to capture and present to the audience the temporal changes in the scene. The display produces "auto stereoscopic integral holograms" where auto means eyewear is not required, stereoscopic means the display is 3D, integral means there are more than two perspectives and hologram refers to diffractive optics.

In the case of a holographic auto stereoscopic telepresence system, the image capture system should be constituted of several video cameras (at least 2) 710 filming the scene 700 according to different positions. A computer 720 processes the images and calculates the hogel data and sends them to a host computer 740 through a computer network 730 (e.g. Ethernet, internet, satellite etc.). For other applications that involve time-shifted playback of the captured scene, the hogel data may be recorded on a storage medium and distributed or transmitted via the network. The host computer 740 drives the holographic display 750 that displays the sequence of holograms 760 in front of the audience 770. The holographic display 750 is a stationary direct-view display that presents the sequence of holograms continuously to the audience. The display is not moved to one location to write (and moved to write each hogel), moved to another location to read and moved to yet another location to erase. For telepresence in which the holograms are presented at video or sub-video rates the display must remain stationary. The proposed system combines integral holography, dynamic refreshable holographic materials such as photorefractive polymers, pulsed laser recording and techniques for recording, reading and erasing the hologram to provide telepresence with auto stereoscopic images and unprecedented image quality. The display may be configured for applications such as theater, television or a computer display.

For an integral holographic display to be used as a telepresence application, several modifications are made. The writing laser source should be a micro second (or less) pulsed laser so the system is desensitized from the ambient vibration and can operate in non-controlled environments (temperature, pressure, air flux). For example, a 1 nanosecond laser has a pulse duration of 1 ns and a repetition rate of, for example, 50 Hz. The light modulator that structures the object laser beam must be dynamic and addressable with images taken from a remote location. The sample (holographic material) must be static. The writing beams than need to be moved with a steering mechanism to record the hologram. This mechanism could be one or more translation stages, tilting mirrors or acousto-optic modulators. The holographic material must be dynamic and refreshable. And finally, the reading beam must be diffracted by the sample while staying in the same position.

Figure 7:
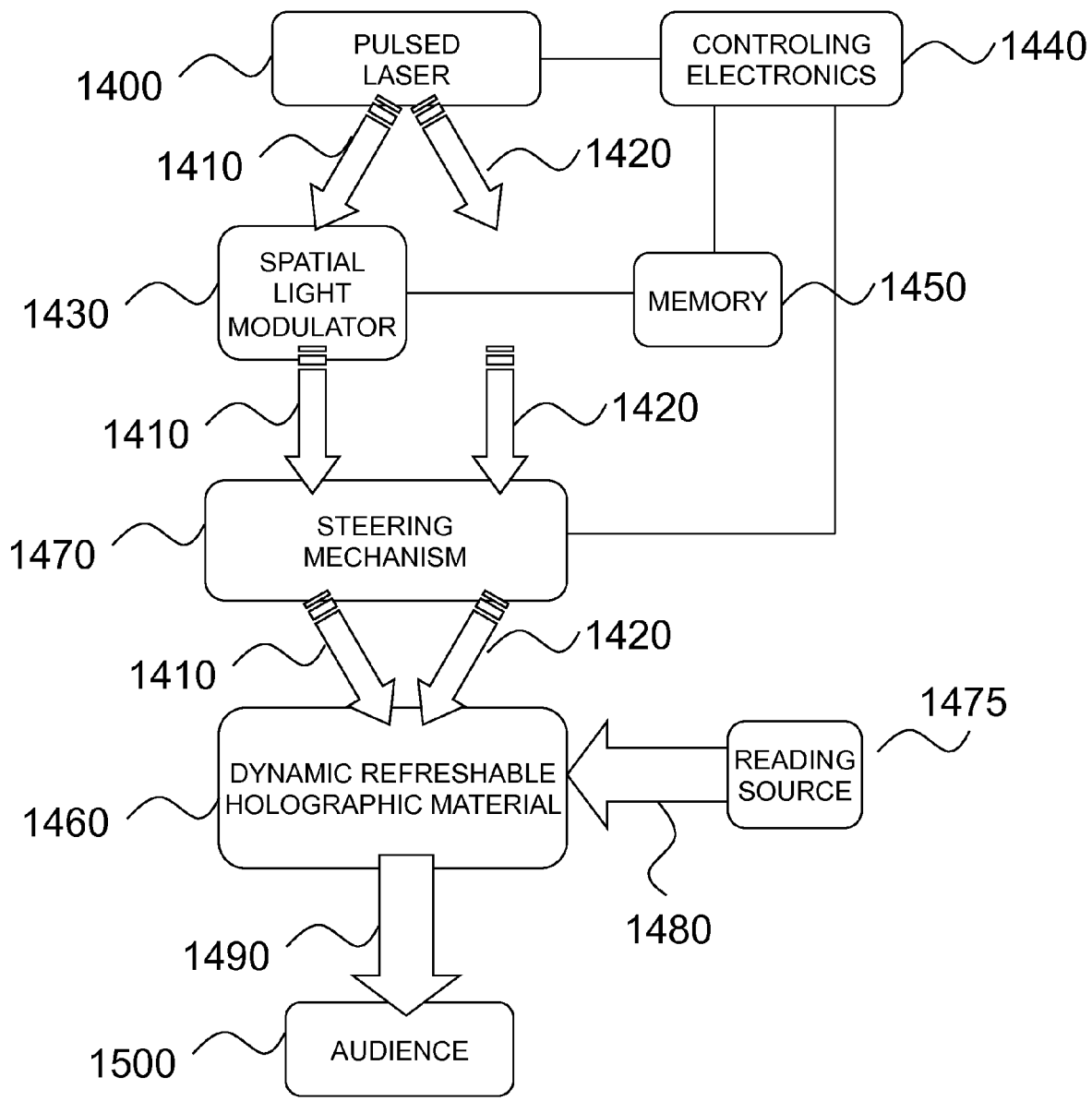
FIG. 7 is a block diagram of an auto stereoscopic 3D telepresence system using integral holography, pulsed laser and photorefractive polymer.

As shown in FIG. 7 in an embodiment of holographic display 750 a pulsed laser 1400 emits a pulse of light that is split into an object 1410 and a reference 1420 beam. A spatial light modulator (SLM) 1430 modulates the object beam to encode the hogel information. The information displayed on the SLM comes from the image processing unit (computer 720 in FIG. 6), delivered to controlling electronic 1440 (host computer 740 in FIG. 6) through the computer link, and stored into the SLM memory 1450. Holographic recording is done by interference of the object beam 1410 and reference beam 1420 into the holographic recording material 1460. A steering mechanism 1470 moves the beams from one position to another to cover the full surface of the material. Each subsequent pulse is suitably encoded with the image for the next hogel. Once the last hogel of the current frame is recorded, the write beams repeat the process and record the first hogel of the next frame and so forth. A reading source 1475 directs a reading beam 1480 to the material 1460 where it gets diffracted 1490 to the audience 1500.

For applications such as telepresence the refreshing rate of the holographic display is preferably as close to video rates as possible to avoid lag and flickering in the image. One way to write the integral hologram at high speed is to use a pulsed laser and to write each hogel with one single pulse. In this case, the recording rate of the hogel is given by the repetition rate of the laser. The entire hologram may, for example, be written at rates equal to or greater than 120 Hz, 60 Hz, 30 Hz, 1 Hz, 0.5 Hz or 0.1 Hz. The refresh rates per hogel (e.g. the repetition rate of the laser) will be a multiple of this rate based on the number of hogels per hologram. Another advantage of pulsed laser is when using a nanosecond or shorter pulse, the holographic recording setup becomes insensitive to the ambiance noise such as vibration, thermal expansion, air turbulence etc. and the system can be run in non-controlled environment.

Figure 8A:
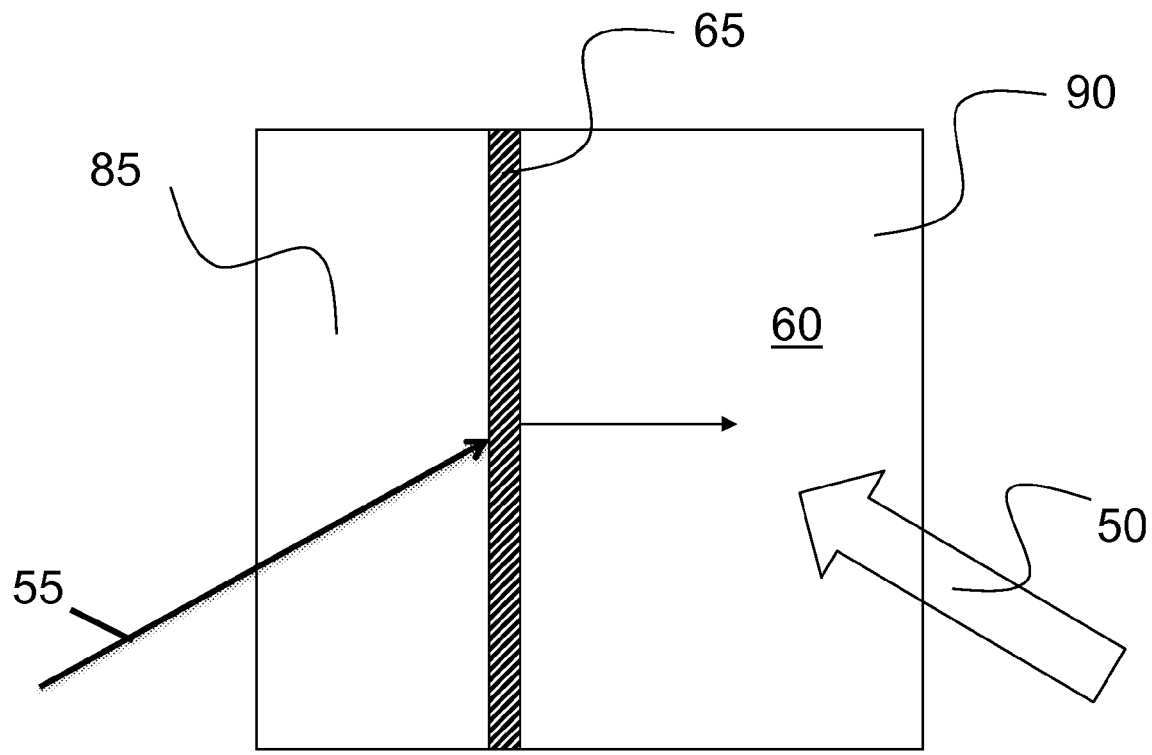
FIGS. 8a and 8b are diagrams depicting simultaneous erasing, recording and writing in HPO and full-parallax, respectively, of the hologram on a stationary direct-view display of the recordable holographic medium.
Figure 8B:
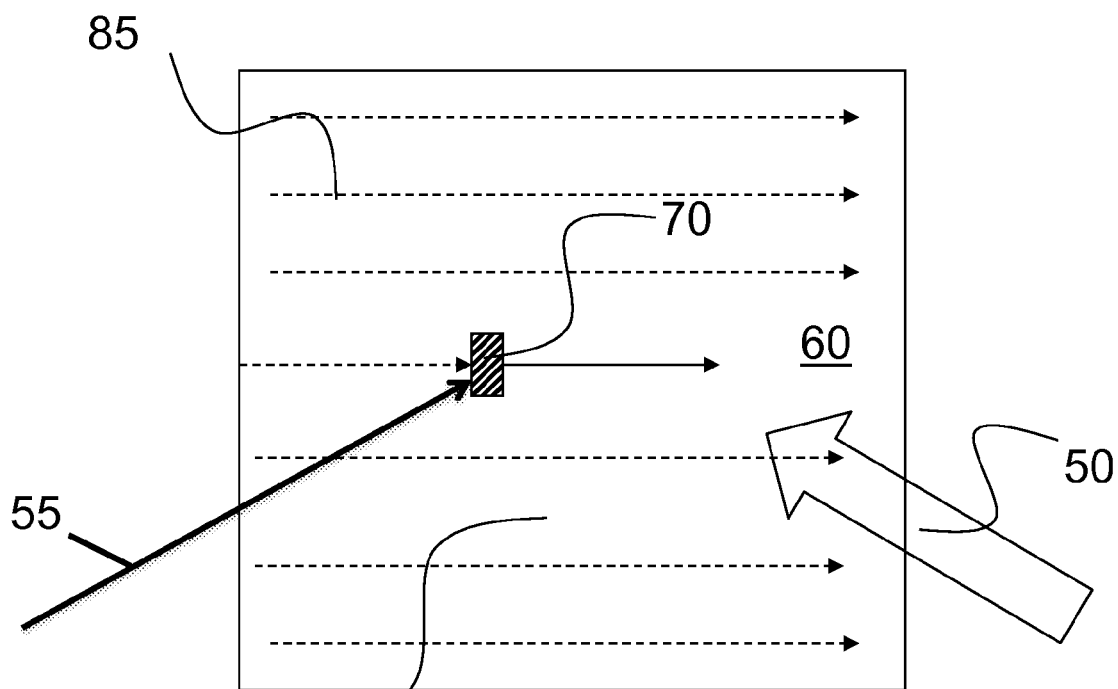

In an embodiment, the individual hogels and entire hologram may be recorded and read at the same time and recorded and erased at the same time as shown in FIG. 8a for a horizontal parallax only (HPO) recording and in FIG. 8b for a full-parallax recording. A reading beam 50 continuously illuminates the whole surface so that the audience sees the diffracted reading beam at every moment. While illuminated with reading beam 50, the write beam 55 scans across the holographic material 60 (e.g. left-to-right in a vertical slit 65 that spans an entire vertical line of the hologram for HPO or in some type of raster scan in a rectangular slit 70 that spans a single line segment) to write the hogels for the current frame. The audience sees a hologram consisting of hogels 85 for the current frame (behind the write beam) and hogels 90 for the previous frame (in front of the write beam). If the rate of recording is sufficiently high (e.g. video rates for the entire hologram), which depends on laser power/material sensitivity and SLM encode rates, the audience may not be able to perceive the effect. In this particular embodiment, write beam 55 also functions as the erase beam to erase the hogel from the previous frame while writing the hogel for the current frame. Alternately, a separate focused write beam may either lead the write beam or may be interlaced in time with the pulsed write beam to erase the next hogel just prior to writing. In each case, the erase beam is a shaped beam that is erasing a hogel either just prior to or coincident with writing. Thus instead of writing the hologram for some period of time, reading the hologram for a period of time and then erasing the hologram for a period of time all three are performed concurrently. This improves the overall throughput of the system by constantly writing.

In an alternate embodiment, the individual hogels and entire hologram may be erased/recorded and then read at different times. For example, the hologram could be "shuttered" from the audience while the hogels and entire hologram are erased and recorded with a new hologram. The hologram could be shuttered by strobing the reading source (electronically or with a physical shutter) so that it is off during the erase/record period and on during a read period. This would reduce the overall throughput of the system by suspending writing while the hologram is read.

Figure 9:
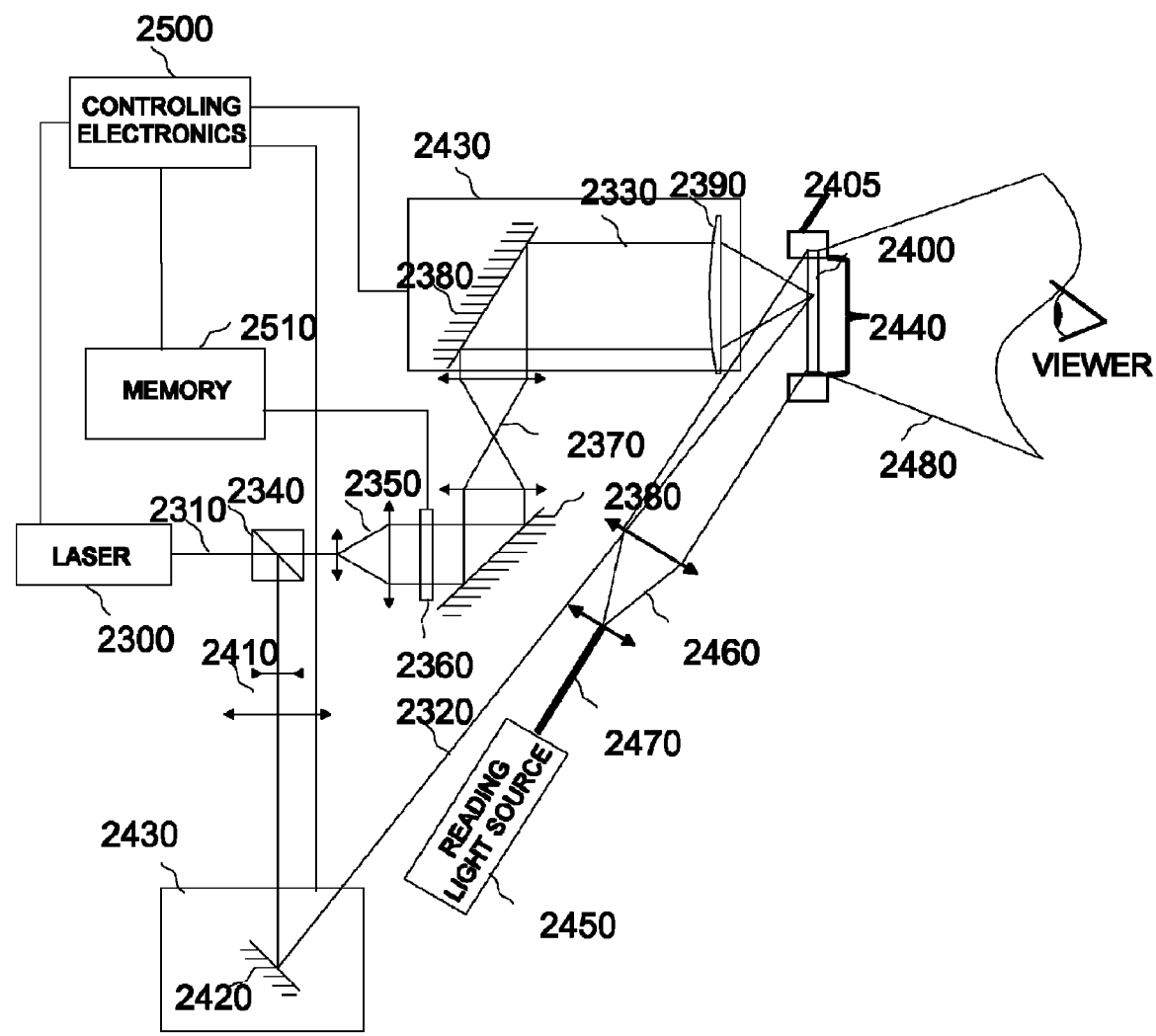
FIG. 9 is a diagram of an integral holography system in a single-color transmission geometry in accordance with the present invention.

In a holographic stereoscopic system using a single-color transmission geometry as shown in FIG. 9, a laser 2300 emits a coherent beam 2310 that is split into a reference beam 2320 and an object beam 2330 by a beam splitter 2340. The object beam is expanded by means of a telescope 2350 and its amplitude is structured by a spatial light modulator 2360 such as a liquid crystal modulator or micro-mirror array. A memory 2510 is used to store the hogel data that makes up each hologram of a temporal sequence of holograms to depict the original scene. Hogel data is read from memory and loaded into SLM 2360. In a real or quasi real-time presentation of a remote scene the hogel data may be simply buffered in the memory as it is received from the network link and then loaded into the SLM. The SLM has a control, which has buffer memory. The hogel data may be directly transferred through this buffer memory to the SLM. Alternately, the hogel data may be stored in memory and then transferred through buffer memory to the SLM.

The object beam is then resized by a telescope 2370, directed by one or several mirrors 2380, and focused by a lens 2390 to write a hologram 2440 on to the holographic recording material 2400 (one line or one line segment at a time) that is held in place by a stationary mount 2405. Lens 2380 is spherical in the case of full parallax and cylindrical in the case of horizontal parallax only (HPO). The reference beam 2320 is shaped by optics 2410 to match the shape of the object beam at the holographic material location, and directed by a mirror 2420 to the holographic recording material. After one hogel has been recorded, the object and reference beams are steered to move to the next hogel location in sync with loading the data for the next hogel into SLM 2360. In this embodiment, the write beams also function as the erase beam. In this embodiment, a translation stage 2430 moves mirror 2380 and lens 2390 in one or two axis if HPO or full parallax to steer object beam 2330. A translation stage 2435 moves mirror 2420 in one or two axis to steer reference beam 2320. Controlling electronics 2500 ensures the synchronization between the laser 2300, the translation stages 2430 and 2435 and SLM 2360 that structures the object beam. A reading source 2450 emits a light beam 2460 that is expanded by a telescope 2470 and diffracted by the hologram 2440 to form a diffracted beam 2480 toward the viewer's eyes. As such, a hologram is continuously presented to the audience from a stationary direct-view display.

An auto stereoscopic integral holographic display capable of presenting a sequence of holograms to an audience at video or sub-video rates for telepresence or other applications requires a dynamic refreshable holographic material. Dynamic in the sense that the holographic material is self-developing. Refreshable in the sense that the holographic material may be erased and another hologram be rewritten. Photorefractive materials are one such material.

Photorefractive (PR) polymers are dynamic holographic recording materials capable of fulfilling these requirements. In PR polymers, a three-dimensional refractive index pattern—a phase hologram—replicates the non-uniform interference pattern formed by two incident coherent light fields. This effect is based on the build-up of an internal space-charge field due to selective transport and trapping of the photo-generated charges, and an electric field induced index change via the PR effect. This process—in contrast to photochemical processes involved in photopolymer holograms—is fully reversible, as trapped charges can be de-trapped by uniform illumination. The erasibility of the PR gratings allows for refreshing/updating of the holograms.

The PR polymer may be a completely polymerized system such as copolymers and terpolymers or a so-called guest host composite systems comprising a host polymer into which low molecular weight compounds are mixed. It is also possible to have copolymers mixed with several guests that are intermediate between these two limits.

An example of a guest/host PR polymer is a copolymer with a polyacrylic backbone that was used to attach pendant groups, tetraphenyldiaminobiphenyl-type (TPD) and CAAN in the ratio 10:1 (PATPD-CAAN) by the synthetic modification of the PATPD polymer. The host PATPD-CAAN copolymer provides the optical absorption and charge generation/transport at the writing wavelength (532 nm). A plasticizer, 9-ethyl carbazole (ECZ) was added to the composite. The NLO properties are achieved by adding a fluorinated dicyanostyrene (FDCST) chromophore. The composite PATPD-CAAN:FDCST:ECZ (50:30:20 wt %) was formed into thin-film devices by melting it between two indium tin oxide (ITO) coated glass electrodes with a thickness of 100 μm set by glass spacer beads. The PR thin-film devices show near 90% diffraction efficiency at an applied voltage of 4 kV in steady-state four-wave mixing (FWM) measurements. The two-beam coupling (TBC) gain coefficient for these devices at 5 kV is around 200 $cm^{-1}$. The device shows no degradation or dielectric breakdown for extended periods of usage (several months) in display recording experiments, with hundreds of write/erase cycles every month at high applied voltages (9 kV) and optical intensities around 100 mW/$cm^2$. As described in pending PCT Application PCT/US2008/050056 filed Jan. 2, 2008 by Nitto Denko Technical Corporation entitled "Systems and Methods for Improving Performance of a Photorefractive Sample" a buffer layer of a polymer dielectric may be added to the PR polymer. Experiments have shown that the buffer layer increases the breakdown voltage.

In order to sensitize the photorefractive material to the nanosecond pulse, we doped the polymer with PCBM, a fullerene derivative ([6,6]-phenyl-$C_{61}$-butyric acid methyl ester). A copolymer with a polyacrylic backbone was used to attach pendant groups, tetraphenyldiaminobiphenyl-type (TPD) and dicyanostyrene (DCST) in the ratio 10:1 (PATPD-DCST) by the synthetic modification of the PATPD polymer. A plasticizer, 9-ethyl carbazole (ECZ) was added to the composite to lower the glass transition temperature and facilitate the chromophore alignment in the photorefractive space charge field. The index modulation properties are enhanced by adding a fluorinated dicyanostyrene (FDCST) chromophore. The final composite TPD/DCST:FDCST:ECZ:PCBM (49.5:30:20:0.5 wt %) was melted between two ITO coated glass plates, with 100 μm spacers used to fix the film thickness. Long-term stability against both crystallization and dielectric breakdown have been observed with this material, with samples used for months without any sign of degradation.

Simultaneous Write and Read

Figure 1:
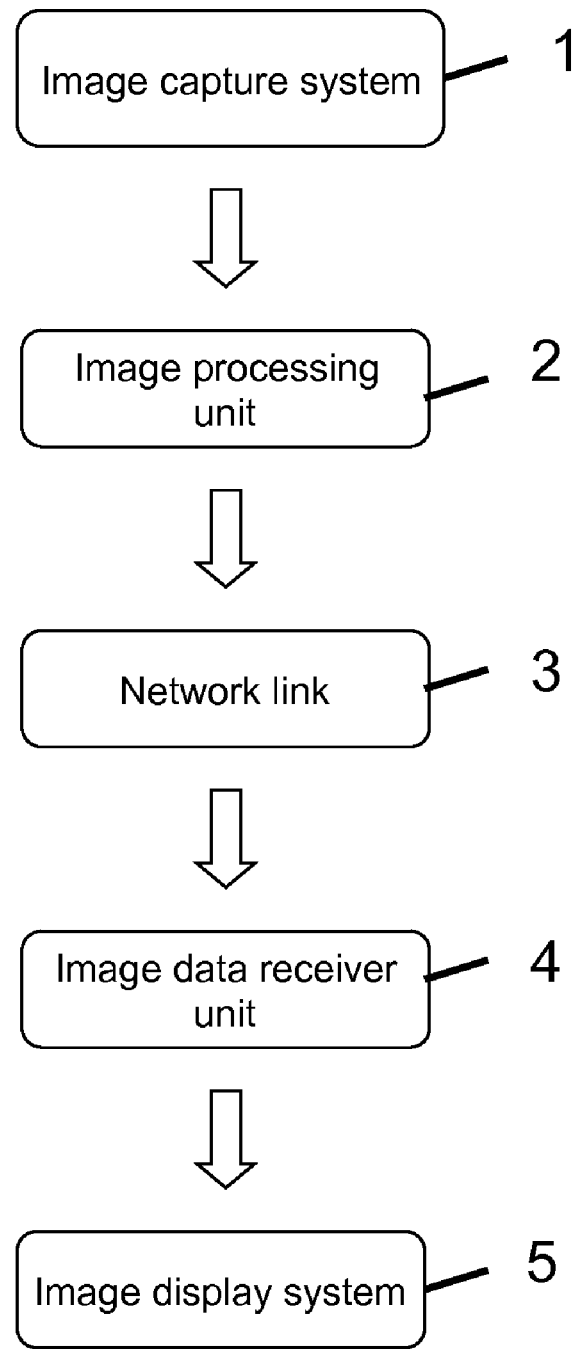
FIG. 1, as described above, is a block flow diagram of a telepresence system.
Figure 2:
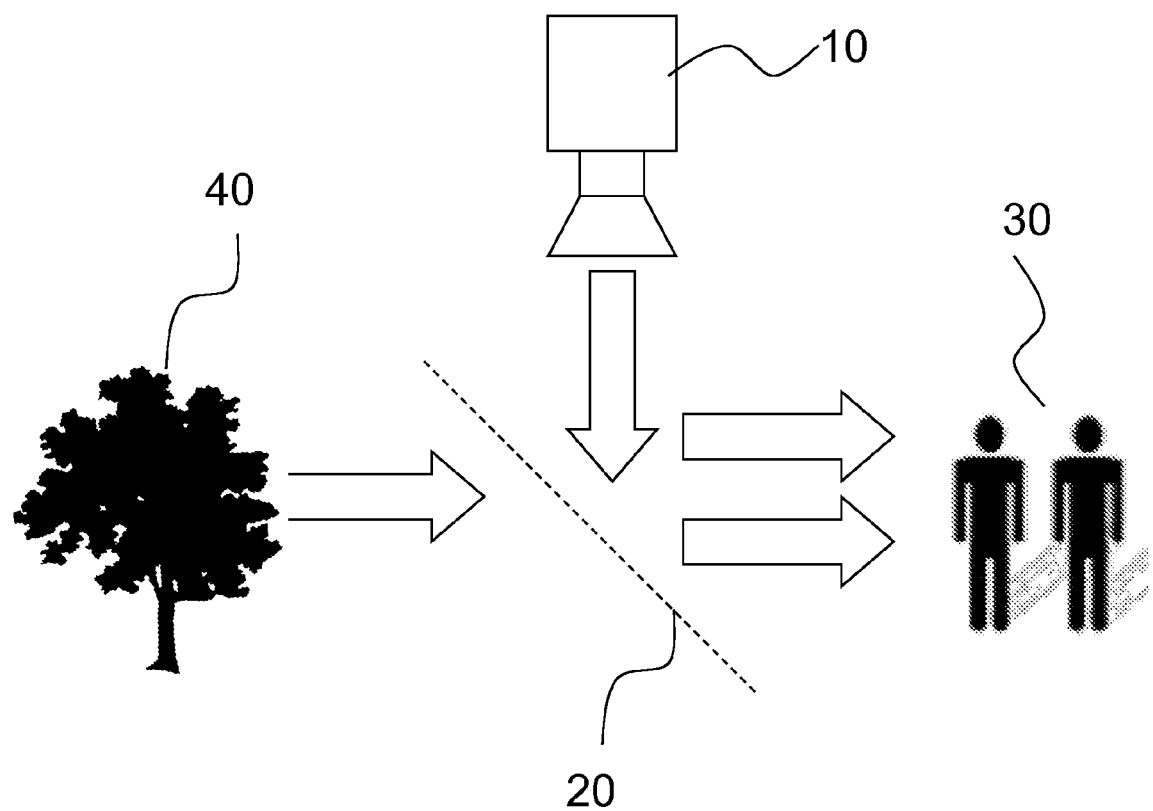
FIG. 2, as described above, is a block diagram of an on-stage holographic telepresence system that projects 2D images onto a semitransparent screen to produce a "paper ghost effect"
Figure 3:
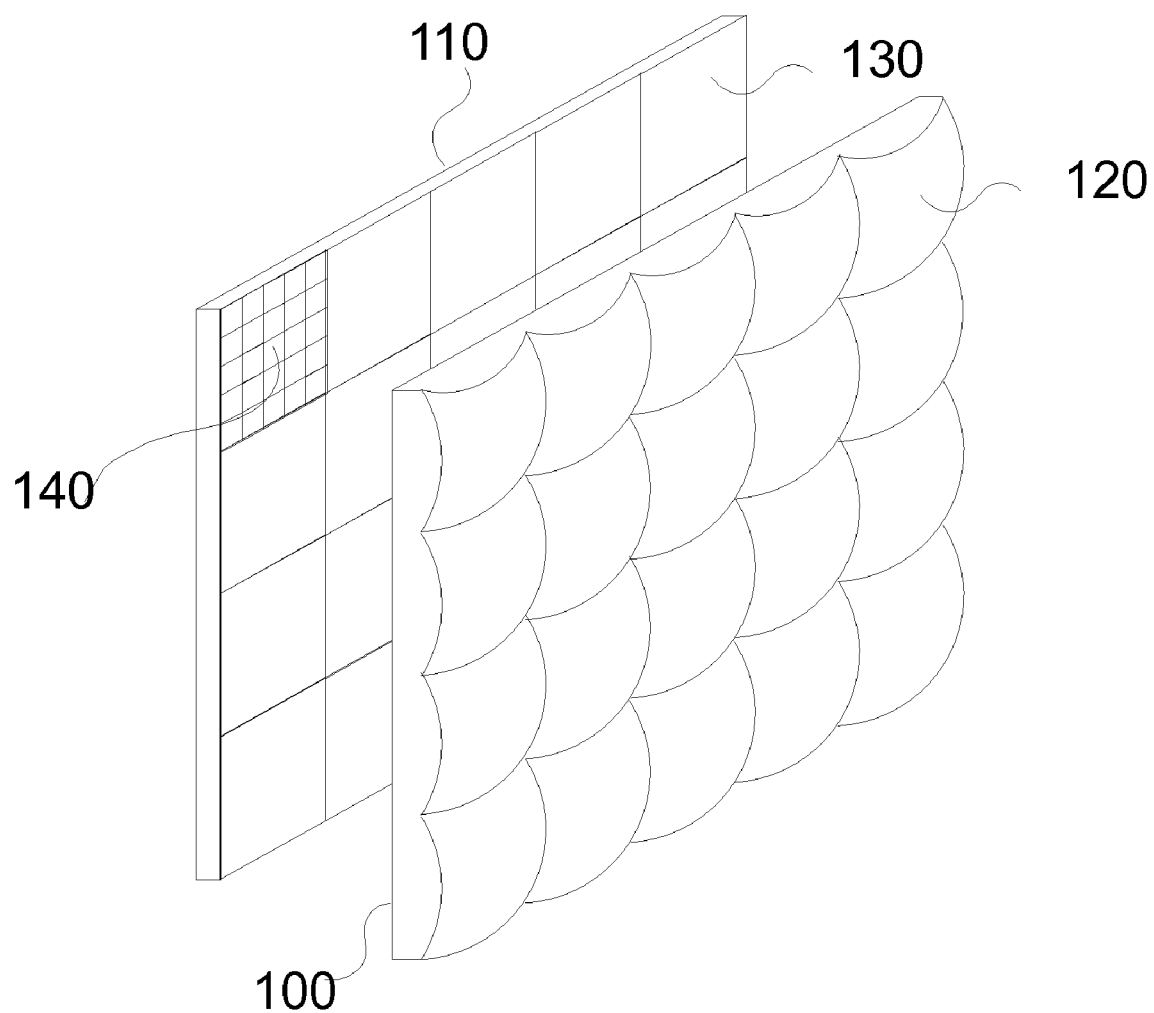
FIG. 3, as described above, is a diagram of an auto stereoscopic 3D display technique referred to as integral imaging.
Figure 4:
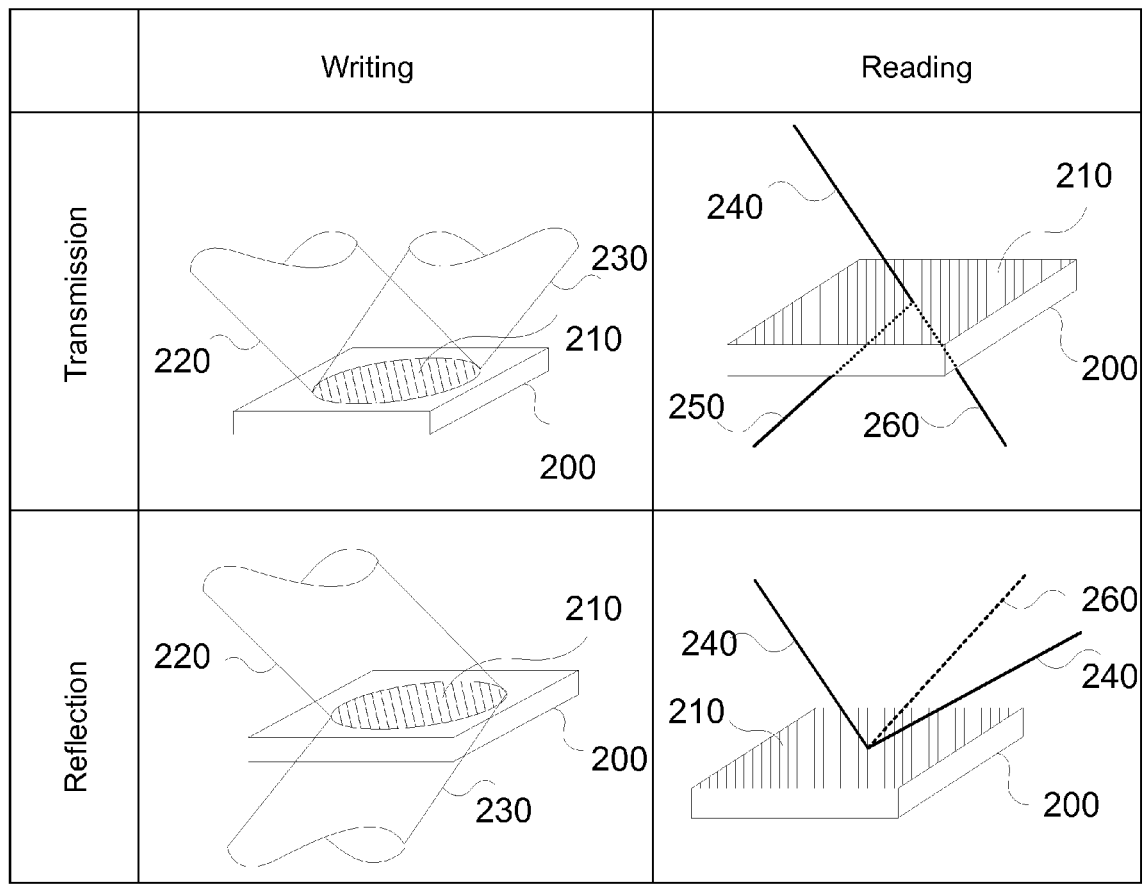
FIG. 4, as described above, is a diagram illustrating transmission and reflective holographic writing and reading geometries.
Figure 5:
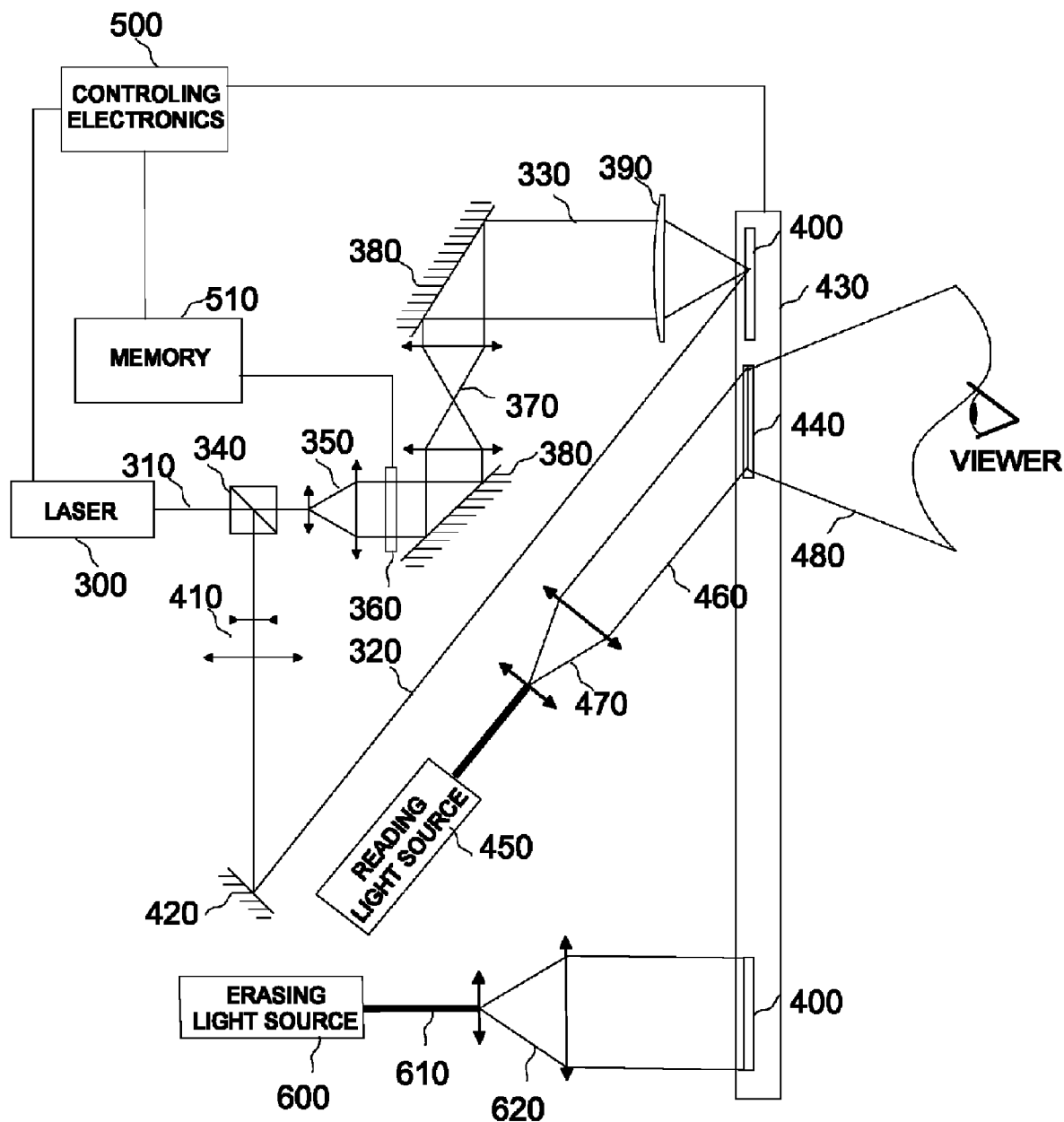
FIG. 5, as described above, is a diagram of an integral holography system.

In previous integral holographic setups, the writing and reading function are both physically and temporally separated (see FIG. 5). The image is recorded at one position but the hologram is read and displayed at another position. This geometry is not practical for a telepresence system since the holographic recording material has to move. The audience will see the screen moving back-and-forth for the hologram to be recorded and then displayed. Separation of the write and read also reduce the overall throughput of the system. The previous set-up may be acceptable to present a sequence of static holograms that are each individually presented to the viewer for a period of time but is not acceptable to present a temporal sequence of holograms at video or sub-video rates to depict a dynamic scene.

One way to record and display the hologram simultaneously in the transmission holographic recording geometry is to steer and focus the object and reference beams to record one hogel at a time on the holographic material and to position the reading light source behind the material to illuminate the material.

Figure 10A:
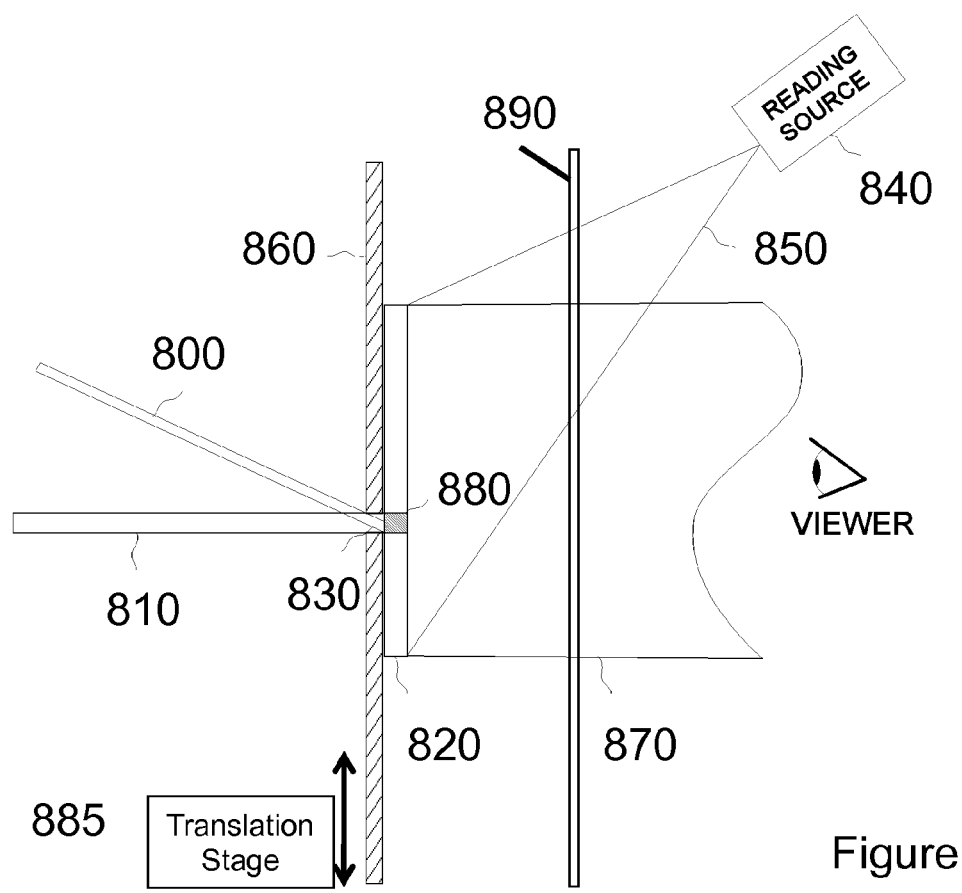
FIGS. 10a and 10b show embodiments of simultaneous writing and reading for transmission and reflective geometries, respectively.

Another way to record and display the hologram simultaneously in the transmission holographic recording geometry is to put a mirror on the back of the material. That mirror has an aperture that allows the writing beams to access the material. The reading beam is sent from the front of the material, reflected back by the mirror and diffracted toward the viewer. As shown in FIG. 10a in a transmission geometry the reference 800 and object beam 810 interfere at the holographic recording material 820 position. A reading light source 840 positioned on the other side of the material emits a light beam 850 directed toward the material. The reading beam goes through the material, gets reflected by a mirror 860, and then is diffracted to reconstruct the hologram beam 870 toward the viewer direction. In order to let the writing beam pass through the mirror 860, an aperture 830 the size of the hogel 880 is made in the mirror. The mirror has the dual-function to act as a mask to precisely define the area on the material written by the write beam. A translation stage 885 stage moves the mirror, and more particularly aperture 830 in synchronization with the steering of the write beams to record the next hogel. A filter 890 may or may not be put in front of the holographic recording media to block the writing beam to protect the viewer from the laser light.

Figure 10B:
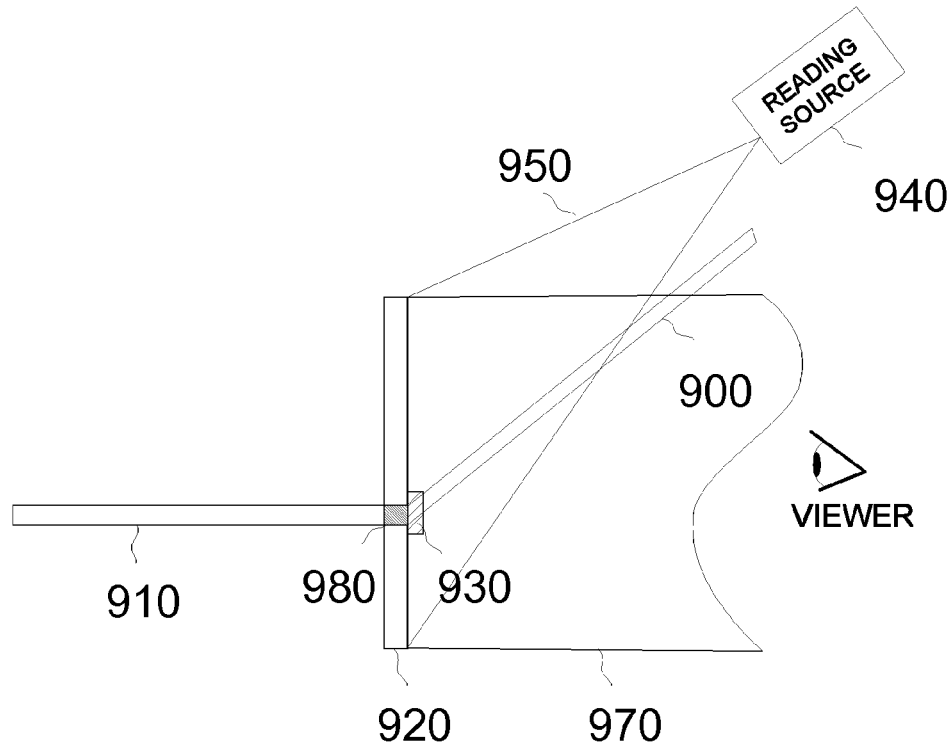

As shown in FIG. 10b, in a reflection geometry the reference 900 and object beams 910 interfere at the holographic recording material 920 position. A reading light source 940, positioned on the same side of the material as the reference beam, emits a light beam 950 directed toward the material. The reading beam is diffracted back 970 by the material toward the viewer. If the viewer is to be protected from the object beam light 910 that is directed in the same direction as the diffracted beam 970, a dichroic filter 930 is positioned at the hogel recording location 980. The filter either moves with the recording location 980 or is large enough to cover the material. The band pass of the dichroic filter is tuned so it blocks the object beam light incident at 0° but lets pass the light from the reference beam 900 incident at a larger angle and the reading beam 950. A mask with an aperture may be placed behind the material and translated to define the hogel area written by object beam 210.

Simultaneous Erase and Write

In previous integral holographic setups, erasing the previously recorded hologram was done with an independent part of the setup. A separate erase beam illuminates the entire holographic recording material to remove the previously recorded image so a new hologram can be recorded. This erasing function is important so there is no ghost image when a new hologram is displayed. Unfortunately erasing takes some time that is not compatible with fast refreshing rate required by telepresence or other application. Erasing also required the material to be moved to the other position to be illuminated by the erasing beam. For telepresence and other applications, the screen must remain static when the audience is looking at it, so the holographic recording material cannot move.

An approach to overcome this problem is to use the writing beams as the erasing beam. The writing beam simultaneously erases the previous hologram encoded into a hogel (line or line segment) and writes the current hologram. Based on the diffraction efficiency of the material, the power and intensity ratio of the write laser are tuned so that the write beam completely erases the previous hologram (i.e. no ghost image) without creating a permanent set to the new hologram. If the power/intensity is too low, the beam will not completely erase the previous hologram. If the power/intensity is too high, the beam may permanently write the hologram into the material so that it cannot be erased.

Figure 11:
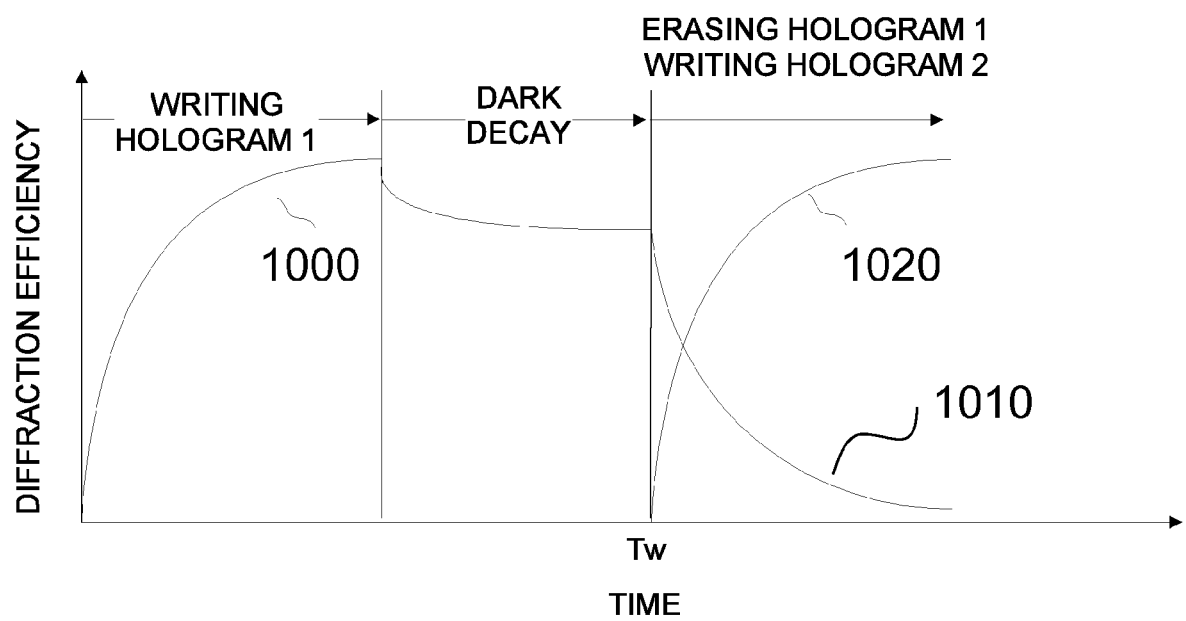
FIG. 11 illustrates an embodiment of simultaneous erasing and writing.

As shown in FIG. 11, in photorefractive media, the hologram diffraction efficiency 1000 rises according to the writing time and then decay when the writing beams are turned off (e.g. dark decay). When the erasing light illuminates the hologram, the diffraction efficiency decreases according to time 1010. To simultaneously write a new hologram and erase the old one, the writing beams of the second hologram are used to erase the first hologram. The efficiency of the second hologram 1020 rises when the efficiency of the first hologram 1010 decreases. In order to avoid any ghost image from the first hologram when replacing the second hologram, the first hologram efficiency should be at a minimum value compared to the efficiency of the second hologram (lower than 20%) when the recording is done. This technique can be applied to each single hogel in the case of integral holography.

Brightness

Figure 12:
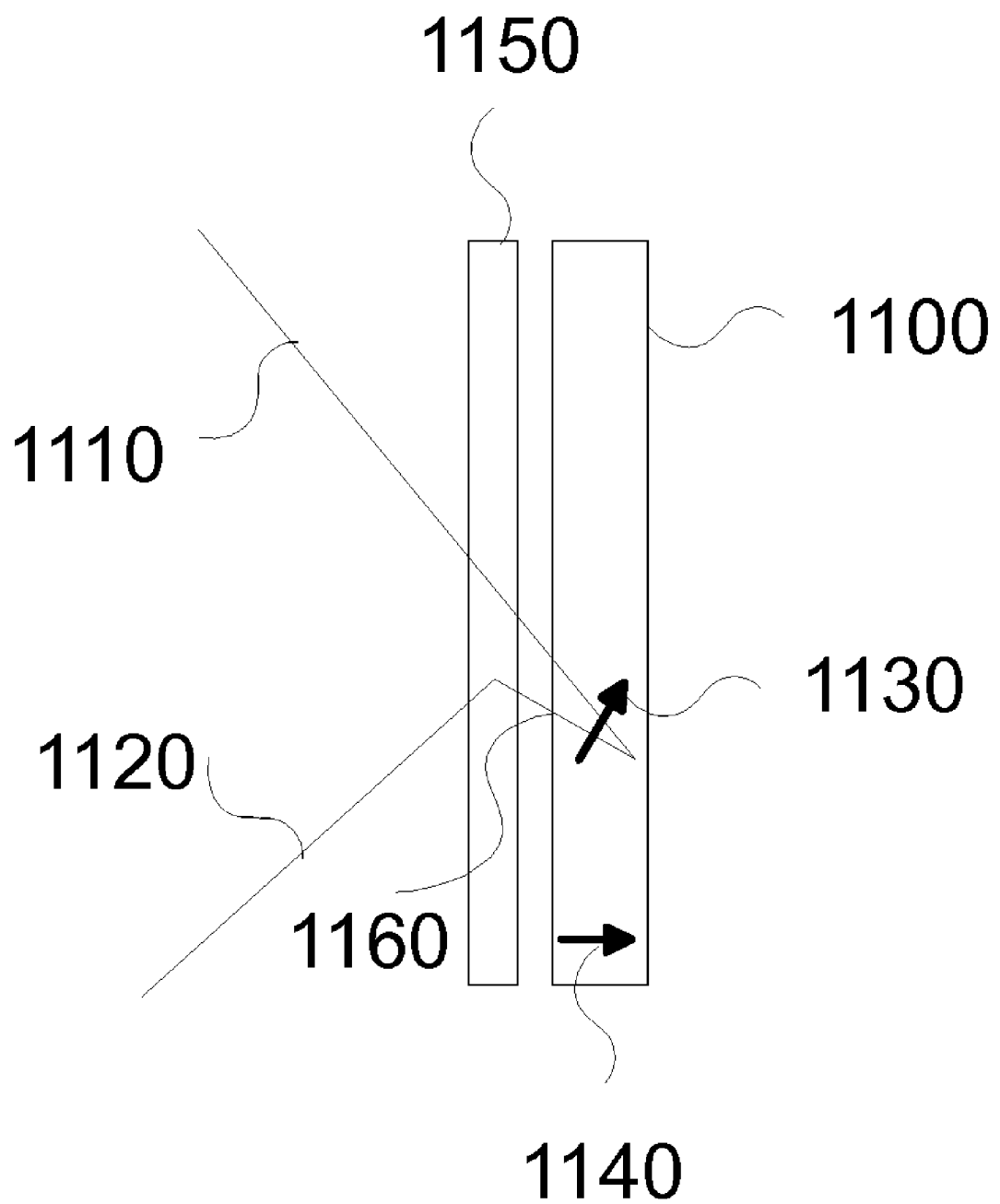
FIG. 12 is a diagram of an embodiment for improving diffraction of the hologram to increase image brightness.

For telepresence and other applications, the image brightness is important. To achieve a bright image the diffraction efficiency of the hologram must be high. In photorefractive polymers the grating vector must be as parallel as possible with the external electric field to increase the diffraction efficiency. A way to achieve this function is, as presented in FIG. 12, to use an optical holographic element in front of the material so the writing beams are redirected as a larger angle. It is possible to increase the diffraction efficiency in a photorefractive polymer material 1100 by reducing the angle between the grating vector 1130 (defined as orthogonal to the bisector of the writing beams 1110 and 1120) and the external electric field vector 1140. In integral holography this angle is limited by the size of the optics and cannot directly be reduced. An holographic optical element 1150 can be placed in front of the material 1100 and designed so the object beam 1110 passes through it, and the reference beam 1120 is diffracted 1160 at an acute angle.

Full Parallax

Full parallax or horizontal parallax only (HPO) holograms can be achieved with integral holography. The advantage of horizontal parallax only is that the number of hogels to be recorded is reduced by a square root factor compare to full parallax. This reduces the recording time by the same factor and improves the refreshing time of the system. But for better rendering, full parallax is still desirable.

Figure 13:
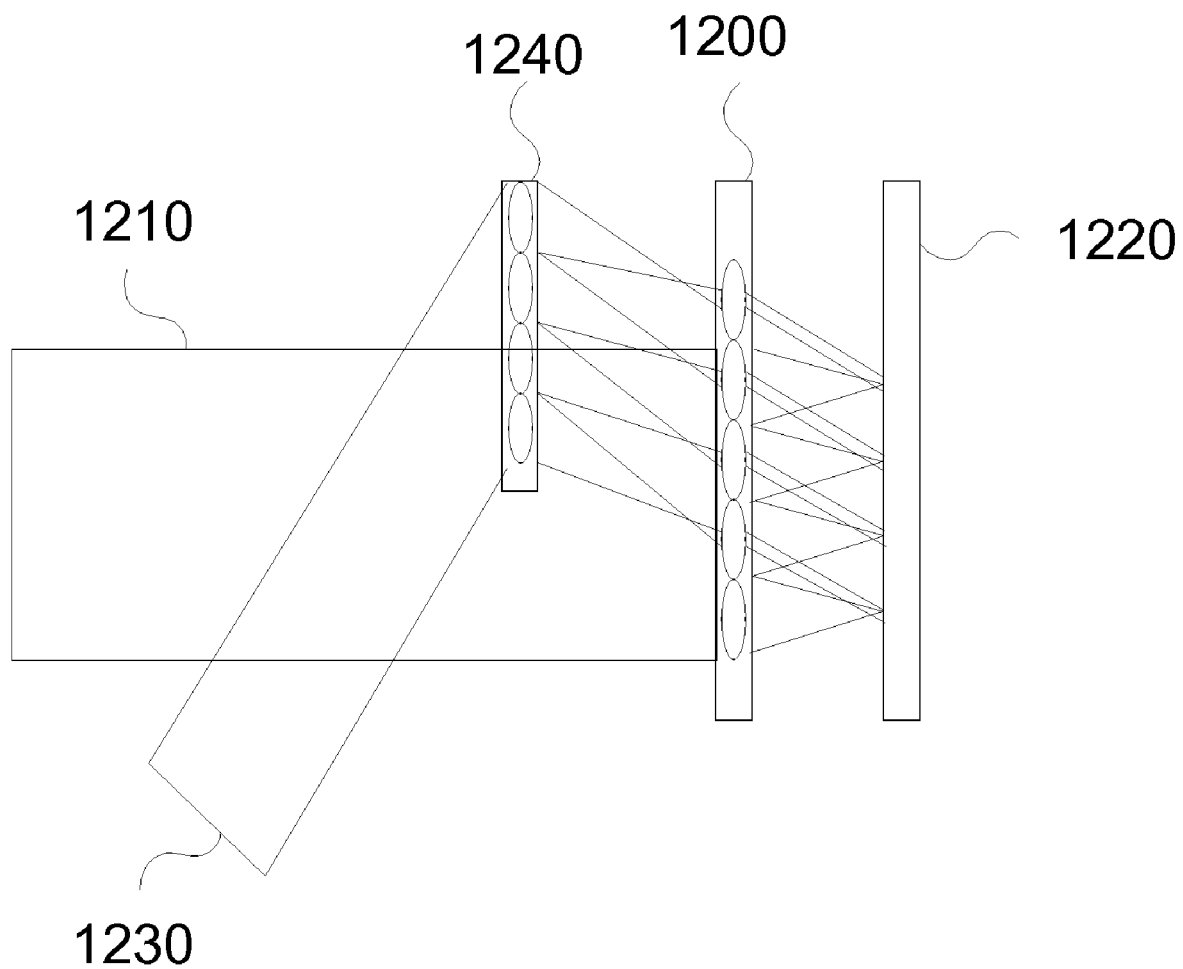
FIG. 13 is a diagram of an embodiment to record a full parallax hologram at higher throughput.

One way to record full parallax holograms at high speed is to record several hogels at the same time. This spatial multiplexing can be achieved by dividing the reference and object beams into different sub apertures as presented in FIG. 13. In an embodiment, a lens array 1200 focuses the object beam 1210 on the recording material 1220 at several places. In this case, the object beam is spatially structured such that each place corresponds to the correct hogel information. For example, instead of using the entire SLM to modulate the object beam the SLM is structured to match the lens array. The reference beam 1230 is diffracted by a diffractive element 1240 that splits the beam into several reference beams. The optical system constituted by the diffractive element 1240 and the lens array 1200 collimates the reference beams. The object and reference beams interfere at several locations effectively writing several hogels at once.

In full parallax, hogel surface is a square in which the lateral dimension defines the resolution. In HPO, the hogel is a line in which the line width defines the lateral resolution. For the same lateral resolution, the recording beam energy that is spread over the full line of the HPO hologram can be redistributed into as many squares to obtain the same surface and have full parallax hologram. The same recording energy is used in both cases.

Full Color

Full color holograms can be generated by integral holography by recording three holograms one for each fundamental color (red green and blue). One approach is to use three separate pulse lasers, one for each color. Depending on the recording geometry, different techniques can be use. For example, in transmission geometry, angular multiplexing can be used with a single pulse laser source. In this case the beam is separated into reference and object beams having both polarization components (horizontal and vertical or circular left and right polarizations). The object beam is split and polarized to produce three object beams that are incident at different angles to the media. To avoid cross talk between the resulting holograms, two of the object beams have orthogonal polarization. The third beam, which must have one of the two polarizations, is positioned at an angle of incidence to take advantage of the fact that photorefractive polymers do not record holograms if the vector is orthogonal to the external electric field. Each object beam is encoded with hogel data for one of the primary colors.

An embodiment of a recording geometry with angular and polarization diversity is presented in FIG. 14. In this geometry, the reference beam 1300 has both polarization components (here horizontal and vertical, could be circular left and right polarizations). The first object beam 1310 has one polarization (here vertical), and the second object beam 1320 has the orthogonal polarization (here horizontally). Since there exist only two orthogonal polarizations, the third object beam 1330 cannot be polarization independent of the two other object beams. When the grating vector 1340 of the hologram is perpendicular to the external electric field 1350 in a photorefractive polymer material 1360, the diffraction efficiency of that hologram is minimum (zero). To achieve that condition, the object beam 1330 is set at a symmetrical angle from the object beam 1320 (of the same polarization) considering the external electric field vector direction 1380. Beam angles have to be calculated to satisfy the Bragg equation so when each hologram is read with a different color it displays a full color hologram in the direction of the viewer.

Figure 14A:
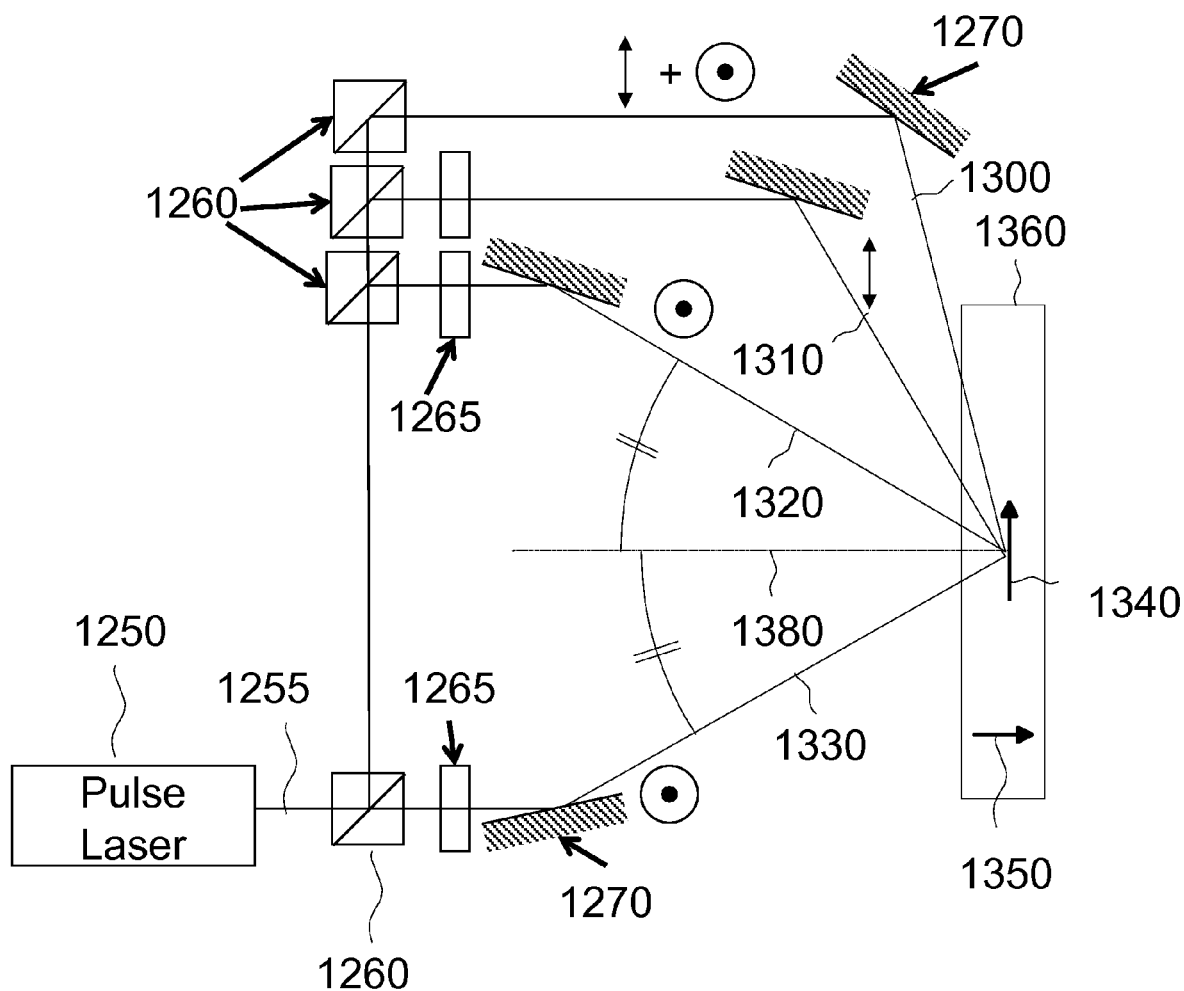
FIGS. 14a and 14b are diagrams of different embodiments to record a full color hologram.

In a particular embodiment as shown in FIG. 14a, a pulse laser 1250 emits a beam 1255 having both polarizations that is split, polarized and reflected off a series of beam splitters 1260, polarizers 1265 and mirrors 1270 to produce the three object beams and reference beam with the specified polarizations and angles of incidence. For simplicity the SLM and beam collimation, focusing and steering are not shown. An SLM could be provided for each color channel and loaded with the hogel data for each color channel. Alternately, the beam could be split into the reference and object beam initially. A single SLM could be structured to modulate the single object beam with hogel data for all three color channels and then split into the three separate object beams.

Figure 14B:
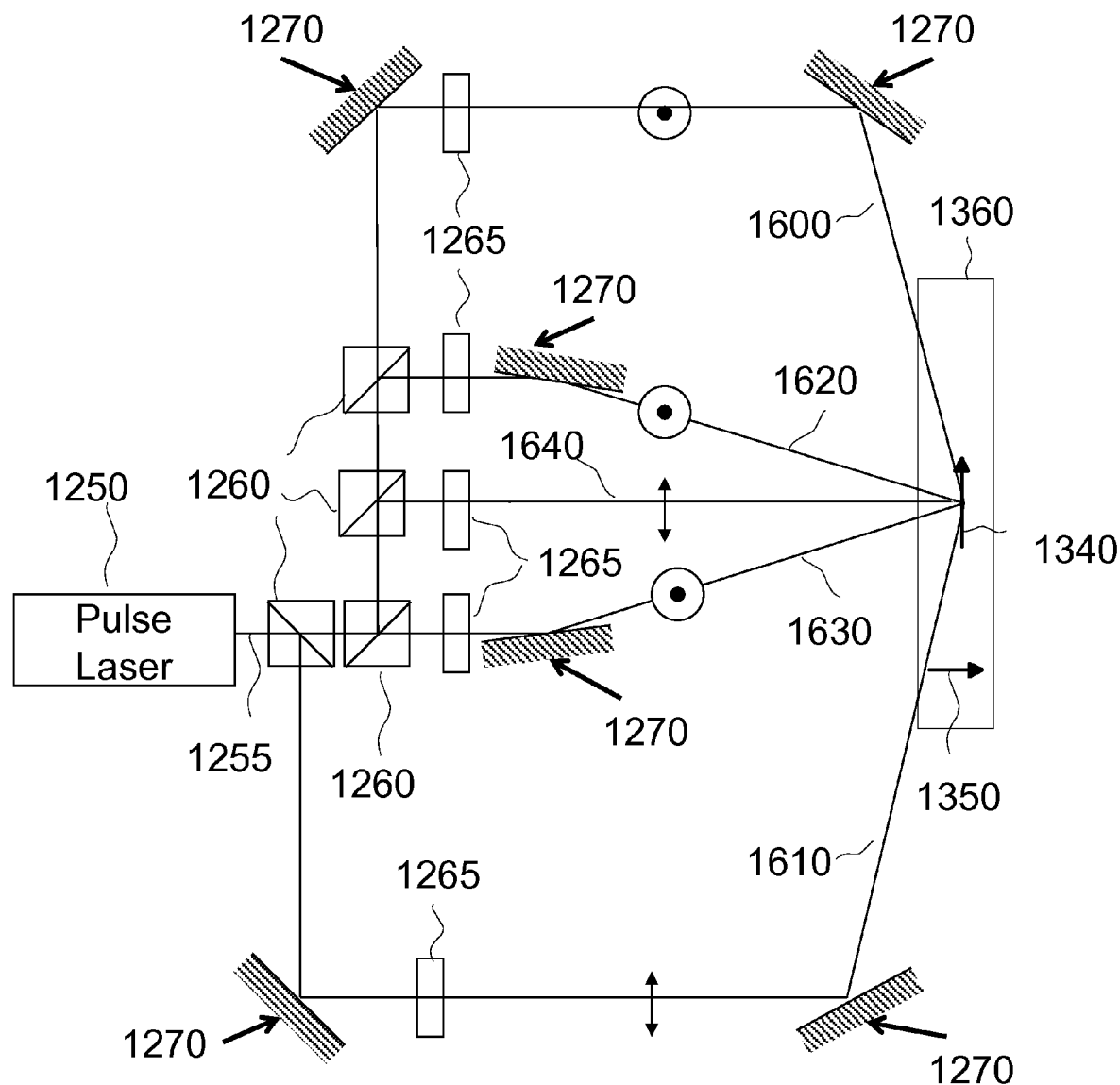

In a particular embodiment as shown in FIG. 14b, a pulse laser 1250 emits a beam 1255 having both polarizations that is split, polarized and reflected off a series of beam splitters 1260, polarizers 1265 and mirrors 1270 to produce three object beams and two reference beams with the specified polarizations and angles of incidence. The two object beams have orthogonal polarizations to prevent their interference.

Among the three object beams, the central one 1640 have one polarization and both external ones 1620 and 1630 have the orthogonal polarization. They are directed along the viewing direction of the display (horizontal). Since angular correction needs to be applied for the three colors to superimpose in the direction of the viewer, the three object beams have different angles according to the pulsed laser wavelength and the color the particular hologram should reproduce. In the case of a doubled YAG laser emitting at 532 nm (green), and a horizontal viewing direction for a red green and blue display (RGB), the horizontal object beam 1640 and the reference beam 1610 are recording the "green hologram". In this case "green hologram" means that it is the color that the hologram will reproduce toward the viewer direction. Since a shift toward longer wavelengths (red) between the recording and the reading wavelength increases the diffraction angle, the angle between the object and reference beams for the "red hologram" should be smaller. Thus, the object beam 1620 and the reference beam 1600 should record the "red hologram". Conversely, the object beam 1630 that is at larger angle, and the reference beam 1600 should record the "blue hologram". Depending of the holographic material properties (thickness and index modulation), both those holograms (blue and red) could diffract the "wrong color", i.e. the blue hologram diffracting red reading beam and the red hologram diffracting blue reading beam. However those colors will be directed at larger and smaller angle compare the direction of the viewer (horizontal) and will not be perceived by the viewer. The fact that the angle between the object beams 1620 and 1630 is symmetrical according to the electrodes of the photorefractive device prevents those beams to write an efficient diffraction grating even though they have the same polarization.

Full Size

In applications such as telepresence or movie theatres it may be desired that the displayed scene is the same size or larger than the original scene. Holograms have the particularity that they cannot be projected on a screen without loosing their 3D aspect. So, the audience must look directly at the holographic recording material to see the 3D hologram. The reproduced scene can never be larger than the holographic material. So for large size telepresence or movies, the holographic material should be of the order of or larger than the original scene. Photorefractive materials such as crystals can only be grown a couple of centimeters in size. Photorefractive polymers can be cast into very large devices and even tiled together to achieve a life size or larger than life size holographic display. For example, a single PR polymer may be 12 inches by 12 inches or larger.

Figure 15:
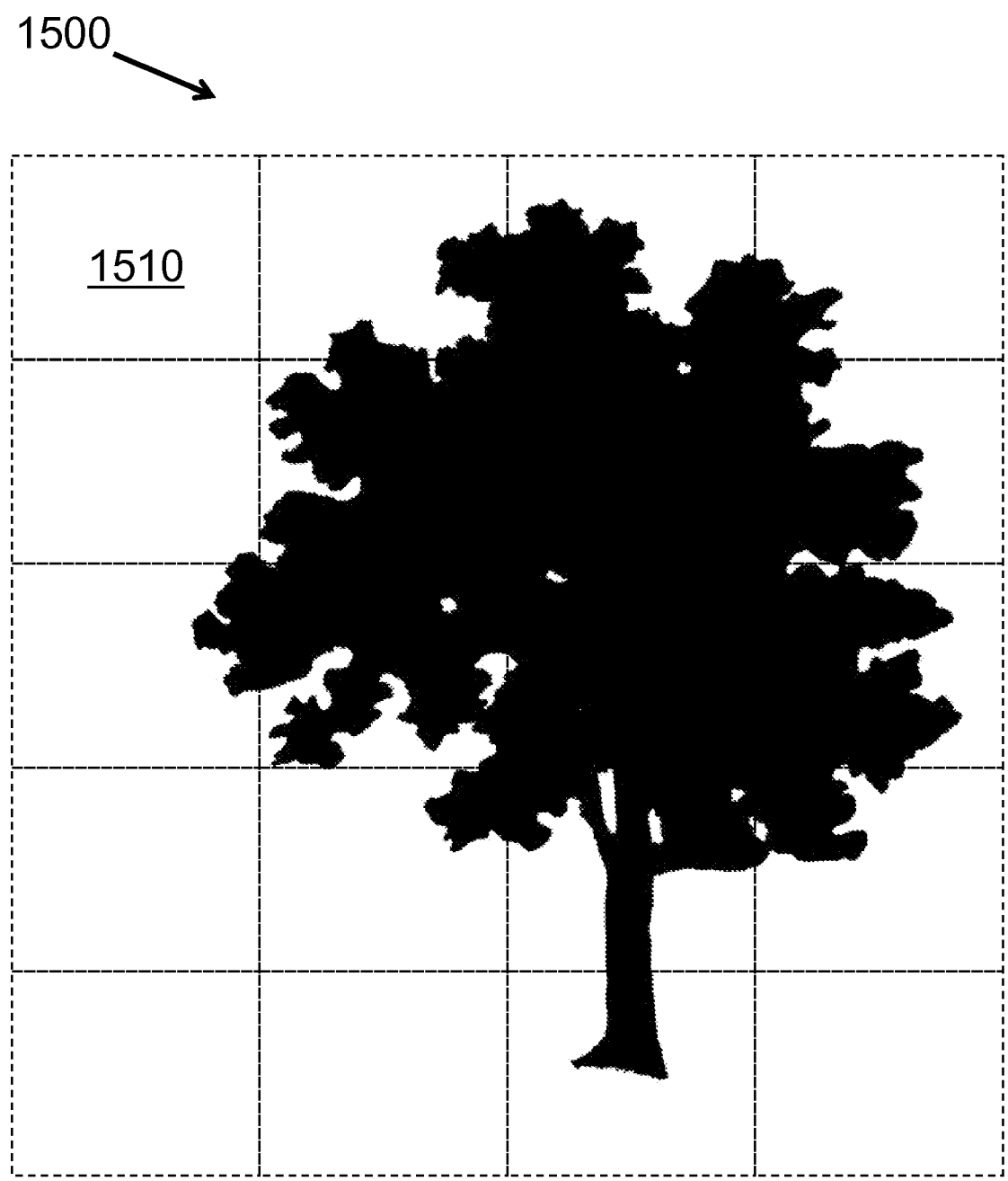
FIG. 15 is a diagram of an embodiment for tiling multiple display for natural size imaging.

As shown in FIG. 15, a direct-view integral holographic display 1500 comprises a 4×4 tiled array or PR polymer displays 1510. Image processing unit or host computer determines how to segment the overall hologram into the appropriate 4×4 tiles. Each tile is then written to the respective display. Each display may be a wholly integrated system of the type illustrated in FIG. 9. In another embodiment, the recording portion of each is display is a wholly integrated system but the reading portion is shared by all of the tiles. Alternately, a single pulsed laser, SLM, optical system and read beam may be used to address all of the tiles. Alternately, an array of pulsed lasers/SLM/optical systems may be used to record a hologram on an even larger array of PR polymer displays. For example, a 10×10 array or recording systems could be used to address a 100×100 array or PR polymer displays. In other words each recording system would address a 10×10 array.

While several illustrative embodiments of the invention have been shown and described, numerous variations and alternate embodiments will occur to those skilled in the art. Such variations and alternate embodiments are contemplated, and can be made without departing from the spirit and scope of the invention as defined in the appended claims.

We claim:

1. An auto stereoscopic integral holographic display, comprising:
    a dynamic refreshable holographic recording material held in a stationary mount to present a stationary direct-view display to an audience;
    a memory;
    hogel data stored in said memory, said hogel data encoded using integral imaging from multiple views of a scene, said hogel data representing a temporal sequence of multiple holograms for presentation to the audience at a refresh rate;
    a pulsed laser that produces a coherent pulsed beam at a repetition rate to support presentation of the holograms at the refresh rate;
    a beam splitter that splits the coherent pulsed beam into an object beam and a reference beam;
    a spatial light modulator (SLM), said hogel data loaded into said SLM as an image to spatially modulate the amplitude of the object beam with the hogel data, said hogel data loaded into said SLM at a load rate to support presentation of the holograms at the refresh rate;
    a beam steering mechanism that steers the modulated object beam and the reference beam relative to the stationary holographic recording material to interfere at the material and write successive hogels at different locations on the material to record the holograms at the refresh rate;
    a reading source that directs a reading beam onto the holographic recording material, said reading beam diffracted by the hologram to produce a diffracted beam that presents the auto stereoscopic integral hologram to the audience, said hologram being refreshed at said refresh rate; and
    control electronics that synchronize the pulsed laser, beam steering mechanism and SLM.

2. A telepresence system, comprising the auto stereoscopic integral holographic display of claim 1, and further comprising:
    an image capture system including multiple video cameras that capture multiple images of a scene according to different positions;
    a computer that processes the images and calculates the hogel data for integral imagery at the refresh rate of the display; and
    a network that transmits the hogel data to a remote location where the display is located to present the auto stereoscopic integral holograms of the scene at the refresh rate to the audience in real or near real-time.

3. The display of claim 1, wherein the holographic recording material comprises a photorefractive polymer.

4. The display of claim 3, wherein the photorefractive polymer has a form factor of at least 12 inches by 12 inches.

5. The display of claim 1, wherein the hogel data comprises either single-color of three-color hogel data.

6. The display of claim 1, wherein the pulsed laser repetition rate is sub-microsecond.

7. The display of claim 1, wherein the pulsed laser records each hogel of the hologram with a single pulse.

8. The display of claim 1, wherein the SLM comprises a liquid crystal modulator.

9. The display of claim 1, wherein the SLM comprises a micro-mirror array.

10. The display of claim 1, wherein the beam steering mechanism comprises one or more translation stages that either translate or tilt optics to steer the object and reference beams.

11. The display of claim 1, wherein the refresh rate of the sequence of holograms is at least 0.1 Hz, 0.5 Hz, 1 Hz, 30 Hz or 60 Hz.

12. The display of claim 1, wherein the holographic recording material comprises multiple tiles of holographic recording material arranged in an array to create a display size greater than any one tile.

13. The display of claim 12, wherein the array of tiles are addressed by a single pulse laser and recording system.

14. The display of claim 12, wherein each tile in the array is addressed by its own pulse laser and recording system.

15. The display of claim 12, wherein the form factor of the array is at least that of the captured scene.

16. The display of claim 1, wherein the reading source directs the reading beam onto the holographic recording material to continuously present the hologram to the audience while the modulated object beam and reference beam write successive hogels to record the holograms.

17. The display of claim 16, wherein a shaped erase beam erases hogel date for the previous hologram while the modulated object beam and reference beam write successive hogels to record the current hologram.

18. The display of claim 17, wherein the shaped erase beam is the object beam, said object beam simultaneously erasing the hogel data for the previous hologram and writing the hogel data for the current hologram.

19. The display of claim 18, wherein the power of the pulse laser is high enough to erase the hogel data without leaving a ghost image and low enough to record the hogel data without causing a permanent set.

20. The display of claim 17, wherein the shaped erase beam is the object beam in which every other pulse constitutes an erase pulse, said beams steered so that the erase pulse erases the hogel data for the previous hologram at a location and then a pulse encoded with hogel data records the hogel for the location.

21. The display of claim 17, wherein the shaped erase beam is a pulsed beam that is temporally interlaced with the write pulse beam to erase the hogel data just prior to the write pulse beam writing the hogel data.

22. The display of claim 17, wherein the shaped erase beam is steered to erase the next hogel just prior to arrival of the write beams.

23. The display of claim 1, wherein the holograms are recording using horizontal-parallax only (HPO) or full-parallax.

24. The display of claim 1, wherein the display is configured for a transmission geometry, further comprising:
a mask/mirror positioned between the pulsed laser and the holographic recording material, said mask mirror comprising an aperture that defines the extent of a hogel and a mirror surface facing the recording material; and
a translation stage that moves the mask/mirror to synchronize the position of the aperture with the location of the steered object and reference and beams,
said read source positioned on the opposite side of the recording material to direct the reading beam through the material where it reflects off the mirrored surface and is transmitted back through the hologram in the material where it is diffracted to produce the diffracted beam.

25. The display of claim 24, further comprising a filter positioned between the recording material and the audience to absorb the object and reference beams that may pass through the material.

26. The display of claim 1, wherein the display is configured for a transmission geometry, further comprising:
a holographic optical element positioned between the holographic recording material and the incident modulated object and reference beams, said HOE configured to allow the object beam to pass there through and to diffract the reference beam at an acute angle to reduce the angle between the grating vector and the external electric field to increase the diffraction efficiency of the material.

27. The display of claim 1, wherein the display is configured for a transmission geometry and full-parallax recording of the hologram, further comprising:
a lens array that focuses the object beam on the recording material at multiple positions, said object beam spatially structured so that each position corresponds to the correct hogel data;
a diffractive element that splits the reference beam into multiple reference beams that are directed to the lens array that collimates the multiple reference beams,
wherein the multiple object and multiple reference beams interfere at the multiple positions on the material to write multiple hogels simultaneously.

28. The display of claim 27, wherein the object beam is spatially structured by loading hogel data for the multiple hogels into the SLM structured to match the lens array.

29. The display of claim 1, wherein the display is configured for a transmission geometry and three-color recording of the hologram from a single pulsed laser writing source, further comprising:
an optical system to separate the pulsed beam into reference and object beams having first and second orthogonal polarization components (horizontal and vertical or circular left and right polarizations);
an optical system to split the object beams into first, second and third object beams, said first and second object beams having said first polarization component and said third object beam having said second polarization component, said first and second object beams positioned to have an angle of incidence so that the grating vector of a hologram formed by cross-talk is perpendicular to the external electric field in the material so that the diffraction efficiency is near zero;
wherein angles of incidence for all three object beams satisfy the Bragg equation so that when each hologram is read with a different color it displays a full color hologram in the direction of the audience.

30. The display of claim 29, wherein to achieve this condition the first object beam is set at a symmetrical angle from the second object beam considering the external electric field vector direction.

31. A telepresence system, comprising:
an image capture system including multiple video cameras that capture multiple images of a scene according to different positions;
a computer that processes the images and calculates the hogel data using integral imagery at a refresh rate of the holographic display;
a network that transmits the hogel data to a remote location; and
an auto stereoscopic integral holographic display at the remote location to present the auto stereoscopic integral holograms of the scene at the refresh rate to the audience in real or near real-time from initial capture, comprising:
- a dynamic refreshable holographic recording material held in a stationary mount to present a stationary direct-view display to an audience;
- a memory;
- hogel data stored in said memory, said hogel data encoded using integral imaging from multiple views of a scene, said hogel data representing a temporal sequence of multiple holograms for presentation to the audience at a refresh rate;
- a pulsed laser that produces a coherent pulsed beat at a repetition rate to support presentation of the holograms at the refresh rate;
- a beam splitter that splits the coherent pulsed beam into an objecting beam and a reference beam;
- a spatial light modulator (SLM), said hogel data loaded into said SLM as image to spatially modulate the amplitude of the object beam with the hogel data, said hogel data loaded into said SLM at a load rate to support presentation of the holograms at the refresh rate;
- a beam steering mechanism that steers the modulated object beam and the reference beam relative to the stationary holographic recording material to interfere at the material and write successive hogels at different locations on the material to record the holograms at the refresh rate;
- a reading source that directs a reading beam onto the holographic recording material, said reading beam diffracted by the hologram to produce a diffracted beam that presents the auto stereoscopic integral hologram to the audience, said hologram being refreshed at said refresh rate; and
- control electronics that synchronize the pulsed laser, beam steering mechanism and SLM.

32. An auto stereoscopic integral holographic display, comprising:
- a dynamic refreshable holographic recording material comprising a photorefractive (PR) polymer held in a stationary mount to present a stationary direct-view display to an audience;
- a memory;
- hogel data stored in said memory, said hogel data encoded using integral imaging from multiple views of a scene, said hogel data representing a temporal sequence of multiple holograms for presentation to the audience at a refresh rate of at least 0.1 Hz, 0.5 Hz, 1 Hz, 30 Hz or 60 Hz;
- a pulsed laser that produces a coherent pulsed beat at a sub-nanosecond repetition rate to support presentation of the holograms at the refresh rate;
- a beam splitter that splits the coherent pulsed beam into an objecting beam and a reference beam;
- a spatial light modulator (SLM), said hogel data loaded into said SLM as image to spatially modulate the amplitude of the object beam with the hogel data, said hogel data loaded into said SLM at a load rate to support presentation of the holograms at the refresh rate;
- a beam steering mechanism that steers the modulated object beam and the reference beam relative to the stationary holographic recording material to interfere at the material and write successive hogels at different locations on the material to record the holograms at the refresh rate;
- a reading source that directs a reading beam onto the holographic recording material, said reading beam diffracted by the hologram to produce a diffracted beam that presents the auto stereoscopic integral hologram continuously to the audience while said object and reference beams continue to record hogels to refresh the hologram at said refresh rate;
- an erase source that directs a focused erase beam onto the material that erases hogel date for the previous hologram while the modulated object beam and reference beam record successive hogels to record the current hologram and
- control electronics that synchronize the pulsed laser, beam steering mechanism and SLM.

33. The display of claim 32, wherein the focused erase beam is the object beam, said object beam simultaneously erasing the hogel data for the previous hologram and writing the hogel data for the current hologram.

34. The display of claim 32, wherein the display is configured for a transmission geometry, further comprising:
- a mask/mirror positioned between the pulsed laser and the holographic recording material, said mask mirror comprising an aperture that defines the extent of a hogel and a mirror surface facing the recording material; and
- a translation stage that moves the mask/mirror to synchronize the position of the aperture with the location of the steered object and reference and beams,
- said read source positioned on the opposite side of the recording material to direct the reading beam through the material where it reflects off the mirrored surface and is transmitted back through the hologram in the material where it is diffracted to produce the diffracted beam.

* * * * *